US012407989B2

(12) United States Patent
Ji et al.

(10) Patent No.: US 12,407,989 B2
(45) Date of Patent: Sep. 2, 2025

(54) DISPLAY PANEL AND DISPLAY APPARATUS

(71) Applicant: BOE Technology Group Co., Ltd., Beijing (CN)

(72) Inventors: Yaqian Ji, Beijing (CN); Lei Wang, Beijing (CN); Yonggang Cao, Beijing (CN); Qianyan Li, Beijing (CN); Yanling Han, Beijing (CN); Yue Gou, Beijing (CN); Xudong Quan, Beijing (CN); Mingkun Yang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/023,707

(22) PCT Filed: May 31, 2022

(86) PCT No.: PCT/CN2022/096465

§ 371 (c)(1),
(2) Date: Feb. 27, 2023

(87) PCT Pub. No.: WO2023/230914

PCT Pub. Date: Dec. 7, 2023

(65) Prior Publication Data

US 2024/0292155 A1 Aug. 29, 2024

(51) Int. Cl.

| | |
|---|---|
| ***H04R 1/02*** | (2006.01) |
| ***H04R 1/28*** | (2006.01) |
| ***H04R 9/06*** | (2006.01) |
| *H04R 25/00* | (2006.01) |

(52) U.S. Cl.

CPC ........... *H04R 9/063* (2013.01); *H04R 1/2811* (2013.01); *H04R 1/2849* (2013.01); *H04R 2400/11* (2013.01)

(58) Field of Classification Search

CPC .... H04R 9/063; H04R 1/2811; H04R 1/2849; H04R 2400/11

(Continued)

(56) References Cited

U.S. PATENT DOCUMENTS

2020/0310736 A1 10/2020 Pastrik et al.
2021/0409854 A1 12/2021 Choi et al.

(Continued)

FOREIGN PATENT DOCUMENTS

CN 108646971 A 10/2018
CN 111491242 A 8/2020

(Continued)

OTHER PUBLICATIONS

Michael C. Heilemann et al., Source Rendering on Dynamic Audio Displays, IEEE Workshop on Applications of Signal Processing to Audio and Acoustics, Oct. 15-18, 2017, pp. 334-338.

(Continued)

*Primary Examiner* — Ammar T Hamid

(74) *Attorney, Agent, or Firm* — Ling Wu; Stephen Yang; Ling and Yang Intellectual Property

(57) ABSTRACT

A display panel includes at least two first display units, the first display unit includes at least one first sub-display unit, the first sub-display unit includes a first sub-display panel and a vibration device connected with the first sub-display panel, the at least two first display units are arranged along a first direction to form a display unit row, in one of the display unit rows, the distance L1 of sound channel centers of two adjacent first display units in the first direction is:

$$2 \times W \times \tan\left(\frac{\beta}{2}\right)$$

(Continued)

wherein, W is the vertical distance between the sound receiving position and a side surface of the display panel facing the sound receiving position; β is an angle between linear distances from the sound channel centers of two adjacent first display units to the sound receiving position respectively in a display unit row, and the β is greater than 2.4 degrees.

20 Claims, 13 Drawing Sheets

(58) Field of Classification Search
USPC .................................................. 381/333, 152
See application file for complete search history.

(56) References Cited

U.S. PATENT DOCUMENTS

2022/0038821 A1 2/2022 Ji et al.
2022/0103940 A1 3/2022 Han et al.
2022/0386019 A1* 12/2022 Ji ............................ H04R 7/18
2022/0394416 A1 12/2022 Gou et al.
2023/0045236 A1 2/2023 Chu et al.

FOREIGN PATENT DOCUMENTS

CN 111586553 A 8/2020
CN 111741412 A 10/2020
CN 111862818 A 10/2020
CN 112135227 A 12/2020
CN 113851049 A 12/2021
CN 113873409 A 12/2021

OTHER PUBLICATIONS

Li Geng, The Mathematical-physical Model of Electro-magnetic Actuator Screen Sound System, Journal of Applied Acoustics, Nov. 2019, pp. 970-979, vol. 38, No. 6.

* cited by examiner

DISPLAY PANEL AND DISPLAY APPARATUS

CROSS-REFERENCE TO RELATED APPLICATION

This application is a national stage application of PCT Application No. PCT/CN2022/096465, which is filed on May 31, 2022 and entitled "Display Panel and Display Apparatus", the content of which should be regarded as being incorporated herein by reference.

TECHNICAL FIELD

The present disclosure relates to, but is not limited to, the field of display technology, and more particularly, to a display panel and a display apparatus.

BACKGROUND

In a display device, a display panel displays images and a separate speaker should generally be installed to provide sound. When a speaker is provided in a display device, the speaker occupies space and therefore the design and space setting of the display device are limited.

When the sound output from the speaker propagates to a rear part or a lower part of the display device, the sound quality is deteriorated due to the interference between the sounds reflected from the wall or the ground. For this reason, there arise problems that it is difficult to realize accurate sound transmission and the immersion of the viewer deteriorates.

SUMMARY

The following is a summary of subject matters described herein in detail. The summary is not intended to limit the protection scope of claims.

In one aspect, the present disclosure provides a display panel, including at least two first display units, the first display unit includes at least one first sub-display unit, the first sub-display unit includes a first sub-display panel and a vibration device connected with the first sub-display panel, the at least two first display units are arranged along a first direction to form a display unit row, in one of the display unit rows, the distance L1 of sound channel centers of two adjacent first display units in the first direction is:

$$2 \times W \times \tan\left(\frac{\beta}{2}\right)$$

Herein, W is the vertical distance between a sound receiving position and a side surface of the display panel facing the sound receiving position; β is an angle between linear distances from the sound channel centers of two adjacent first display units to the sound receiving position respectively in a display unit row, and the β is greater than 2.4 degrees.

In an exemplary implementation, the β is greater than 2.4 degrees and less than 17 degrees.

In an exemplary implementation, the at least two first display units are arranged along a second direction to form a display unit column, and in one of the display unit columns, the distance L2 of the sound channel centers of two adjacent first display units in the second direction is:

$$2 \times W \times \tan\left(\frac{\alpha}{2}\right)$$

Herein, the first direction is different from the second direction; W is a vertical distance between the sound receiving position and a side surface of the display panel facing the sound receiving position; α is an angle between linear distances from the sound channel centers of two adjacent first display units to the sound receiving position respectively in a display unit column, the α is greater than 3.4 degrees.

In an exemplary implementation, the α is greater than 3.4 degrees and less than 17 degrees.

In an exemplary implementation, further including at least one second display unit, the second display unit includes at least one second sub-display unit, the second sub-display unit includes a second sub-display panel, and at least one of the second sub-display units is located between two adjacent first display units in one of the display unit rows.

In an exemplary implementation, the first display unit includes a first sub-display unit, and a sound channel center of the first display unit is a geometric center of the first display unit.

In an exemplary implementation, the first display unit includes multiple first sub-display units, the multiple first sub-display units are configured to be input an identical audio driving signal.

In an exemplary implementation, the first display unit includes multiple first sub-display units, the multiple first sub-display units are configured to be input different audio driving signals.

In an exemplary implementation, the first display unit includes a first sub-display unit a and a first sub-display unit b, the first sub-display unit a is configured to be input a full frequency audio driving signal, the full frequency audio driving signal includes a low frequency audio driving signal, an intermediate frequency audio driving signal, and a high frequency audio driving signal, and the first sub-display unit b is configured to be input the low frequency audio driving signal.

In an exemplary implementation, the sound channel center of the first display unit is the geometric center of the first sub-display unit a.

In an exemplary implementation, the first display unit includes a first sub-display unit a, a first sub-display unit b, and a first sub-display unit c, the first sub-display unit a is configured to be input a full frequency audio driving signal, the full frequency audio driving signal includes the low frequency audio driving signal, the intermediate frequency audio driving signal and the high frequency audio driving signal, the first sub-display unit b is configured to be input the low frequency audio driving signal, and the first sub-display unit c is configured to be input the high frequency audio driving signal.

In an exemplary implementation, the sound channel center of the first display unit is the geometric center of the first sub-display unit c.

In an exemplary implementation, further including a partition structure, the partition structure is located on at least one side of the first sub-display panel.

In an exemplary implementation, the partition structure is a slit or a flexible material.

In an exemplary implementation, the at least two first display units are connected with a driving signal line.

In an exemplary implementation, further including a cabinet, the cabinet includes at least one first sub-cabinet, and the first sub-display unit is provided on the first sub-cabinet.

In an exemplary implementation, the first sub-cabinet includes a connecting frame, a splicing frame, a fixing bracket, and a mounting bracket, the splicing frame is located on a side of a backlight surface of the first sub-display panel, the splicing frame and the first sub-display panel enclose an inner cavity, at least a portion of the connecting frame is located between the splicing frame and the first sub-display panel, at least a portion of the connecting frame extends into the inner cavity, the fixing bracket is located in the inner cavity and connected with at least a portion of the connecting frame, the fixing bracket and the first sub-display panel enclose an acoustic cavity, the mounting bracket is provided in the acoustic cavity, and the vibration device is provided on the mounting bracket.

In an exemplary implementation, the first sub-cabinet includes the connecting frame, the splicing frame, the fixing bracket, and the mounting bracket, the fixing bracket is located on a side of the backlight surface of the first sub-display panel, the fixing bracket and the first sub-display panel enclose an acoustic cavity, at least a portion of the connecting frame is located between the fixing bracket and the first sub-display panel, the splicing frame is located at a side of the fixing bracket away from the first sub-display panel, the mounting bracket is provided in the acoustic cavity, at least a portion of the connecting frame extends into the acoustic cavity and is connected with the mounting bracket, and the vibration device is provided on the mounting bracket.

In an exemplary implementation, at least a portion of the connecting frame extends into the acoustic cavity, the acoustic cavity is divided to form a first cavity and a second cavity, wherein the first cavity is located at a side of the second cavity close to the first sub-display panel, an acoustic vent is provided in the connecting frame, and the acoustic vent communicates the first cavity with the second cavity.

In an exemplary implementation, the first sub-cabinet includes the connecting frame, the splicing frame, and the mounting bracket, the splicing frame is located on a side of the backlight surface of the first sub-display panel, the splicing frame and the first sub-display panel enclose the inner cavity, the inner cavity serves as the acoustic cavity, at least a portion of the connecting frame is provided between the splicing frame and the first sub-display panel, at least a portion of the connecting frame extends into the acoustic cavity, the mounting bracket is provided in the acoustic cavity, the mounting bracket is connected with at least a portion of the connecting frame, and the vibration device is provided on the mounting bracket.

In another aspect, the present disclosure further provides a display apparatus, including the aforementioned display panel.

Other aspects will become apparent upon reading and understanding the accompanying drawings and the detailed description.

BRIEF DESCRIPTION OF DRAWINGS

Accompanying drawings are used for providing an understanding for technical solutions of the present application and form a part of the specification, are used for explaining the technical solutions of the present application together with embodiments of the present application, and do not constitute a limitation on the technical solutions of the present application.

DETAILED DESCRIPTION

Figure 1A:
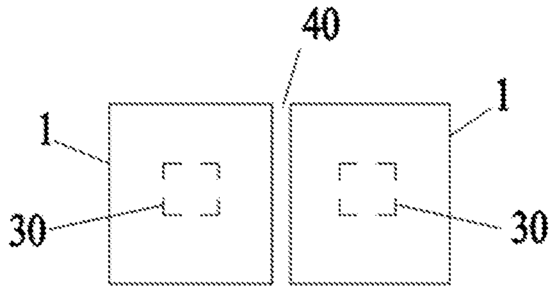
FIG. 1*a* is a schematic structural diagram of two first sub-display units adjacent to each other in a display panel of an embodiment of the present disclosure.

To make objectives, technical solutions, and advantages of the present disclosure clearer, the embodiments of the present disclosure will be described in detail with reference to the accompanying drawings. It is to be noted that implementations may be implemented in multiple different forms. Those of ordinary skills in the art may easily understand such a fact that modes and contents may be transformed into various forms without departing from the purpose and scope of the present disclosure. Therefore, the present disclosure should not be explained as being limited to contents described in following implementations only. The embodiments in the present disclosure and features in the embodiments may be combined randomly with each other in the case of no conflict.

In the drawings, a size of each constituent element, a thickness of a layer, or a region is exaggerated sometimes for clarity. Therefore, one implementation of the present disclosure is not necessarily limited to the sizes, and shapes and sizes of various components in the drawings do not reflect actual scales. In addition, the drawings schematically illustrate ideal examples, and one mode of the present disclosure is not limited to the shapes, numerical values, or the like shown in the drawings.

Ordinal numerals such as "first", "second", and "third" in the specification are set to avoid confusion of constituent elements, but not to set a limit in quantity.

In the specification, for convenience, wordings indicating orientation or positional relationships, such as "middle", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to directions for describing the various constituent elements. Therefore, appropriate replacements may be made according to situations without being limited to the wordings described in the specification.

In the specification, unless otherwise specified and defined explicitly, terms "install", "mutually connect", and "connect" should be understood in a broad sense. It may be a mechanical connecting or an electrical connecting. It may be a direct mutual connecting, or an indirect connecting through middleware, or internal communication between two components. Those of ordinary skill in the art may understand specific meanings of these terms in the present disclosure according to specific situations.

In the specification, a transistor refers to a component which includes at least three terminals, i.e., a gate electrode, a drain electrode and a source electrode. The transistor has a channel region between the drain electrode (drain electrode terminal, drain region, or drain) and the source electrode (source electrode terminal, source region, or source), and a current may flow through the drain electrode, the channel region, and the source electrode. It is to be noted that, in the specification, the channel region refers to a region through which the current mainly flows.

In the specification, a first electrode may be a drain electrode, and a second electrode may be a source electrode. Or, the first electrode may be the source electrode, and the second electrode may be the drain electrode. In cases that transistors with opposite polarities are used, a current direction changes during operation of a circuit, or the like, functions of the "source electrode" and the "drain electrode" are sometimes interchangeable. Therefore, the "source electrode" and the "drain electrode" are interchangeable in the specification.

In the specification, "electrical connecting" includes a case that constituent elements are connected together through an element with a certain electrical effect. The "element with the certain electrical effect" is not particularly limited as long as electrical signals may be sent and received between the connected constituent elements. Examples of the "element with the certain electrical effect" not only include electrodes and wirings, but also include switch elements such as transistors, resistors, inductors, capacitors, other elements with various functions, etc.

In the specification, "parallel" refers to a state in which an angle formed by two straight lines is above −10° and below 10°, and thus also includes a state in which the angle is above −5° and below 5°. In addition, "perpendicular" refers to a state in which an angle formed by two straight lines is above 80° and below 100°, and thus also includes a state in which the angle is above 85° and below 95°.

In the specification, a "film" and a "layer" are interchangeable. For example, a "conductive layer" may be replaced with a "conductive film" sometimes. Similarly, an "insulation film" may be replaced with an "insulation layer" sometimes.

In the present disclosure, "about" refers to that a boundary is defined not so strictly and numerical values within process and measurement error ranges are allowed.

According to the research of the inventor of the present disclosure, in order to realize stereo sound, in a display panel of the related technology, two or three excitation units are usually arranged on a whole face display panel to form two sound channels or three sound channels, and vibration-resistant foam is arranged between the sound channels to prevent crosstalk between the sound channels and reduce the effect of stereo sound. However, in order to realize multi-sound channel sounding, the whole face display panel needs to be divided into several small-sized sounding units. The more the number of sound channels, the smaller the area of the sounding unit. The effect of using foam to prevent vibration is poor, the crosstalk of sound channel is obvious, and the effect of audio-video positioning is poor, which makes the display panel unable to realize fine zoning sounding.

An embodiment of the present disclosure provides a display panel, and the display panel includes multiple first display units and multiple second display units. The multiple first display units and the multiple second display units are spliced to form a display panel.

In an exemplary implementation, the first display unit may include at least one first sub-display unit and at least one second sub-display unit. The first sub-display unit includes a first sub-display panel and a vibration device connected with the first sub-display panel, the first sub-display panel is configured to display an image, the first sub-display unit has a display function and a self-sounding function and is capable of displaying an image and emitting a sound. The second sub-display unit includes a second sub-display panel, the second sub-display panel is configured to display an image, the second sub-display unit is a normal display unit, the second sub-display unit has a display function and does not have a self-sounding function, and the second sub-display unit is only capable of displaying images.

In an exemplary implementation, the first display unit may only include at least one first sub-display unit and does not include a second sub-display unit, and one first display unit may be formed only by at least one first sub-display unit. For example, the first display unit includes multiple first sub-display units arranged to form the first display unit, and the first display unit does not include the second sub-display unit.

FIG. 1*a* is a schematic structural diagram of two first sub-display units adjacent to each other in a display panel of an embodiment of the present disclosure. In an exemplary implementation, as shown in FIG. 1*a*, the first display unit includes two first sub-display units and the first display unit does not include a second sub-display unit. The first sub-display unit includes a first sub-display panel 1 and a vibration device 30 connected with the first sub-display panel 1. The vibration device 30 is located on a backlight surface of the first sub-display panel 1. The first sub-display panel 1 is configured to display an image. The vibration device 30 is configured to drive the first sub-display panel 1 to vibrate so that the first sub-display unit emits a sound. The first sub-display unit 10 has a display function and a self-sounding function and is capable of displaying an image and emitting a sound. The first sub-display unit 10 may also be referred to as a self-sounding display unit.

While the display panel is displaying an image, the first sub-display panel 1 in the first sub-display unit 10 may vibrate based on the driving of one vibration device 30 or more vibration devices 30 to output sound in a direction of the first sub-display panel 1 away from the vibration device 30. In a state in which the display apparatus does not display an image, the first sub-display panel 1 in the first sub-display unit 10 may vibrate based on the driving of one vibration device 30 or more vibration devices 30 to output sound in a direction of the first sub-display panel 1 away from the vibration device 30.

Figure 1B:
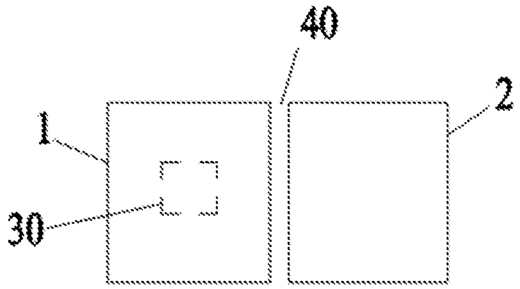
FIG. 1*b* is a schematic structural diagram of a first sub-display unit and a second sub-display unit adjacent to each other in a display panel of an embodiment of the present disclosure.

FIG. 1*b* is a schematic structural diagram of a first sub-display unit and a second sub-display unit adjacent to each other in a display panel of an embodiment of the present disclosure. In an exemplary implementation, as shown in FIG. 1*b*, the second display unit includes a first sub-display unit and a second sub-display unit 20, and the second sub-display unit 20 includes a second sub-display panel 2. The second sub-display panel 2 is configured to display an image. The second sub-display unit is a normal display unit, the second sub-display unit has a display function but does not have a self-sounding function, and the second sub-display unit can only display an image.

Figure 1C:
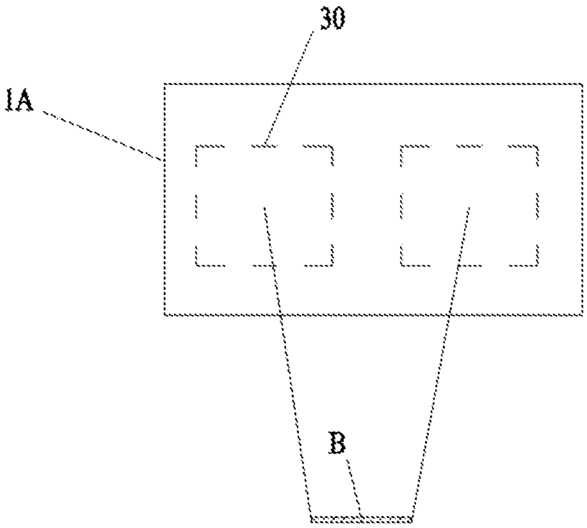
FIG. 1*c* is a schematic diagram of an effective listening range of a related display panel.

FIG. 1*c* is a schematic diagram of an effective listening range of a related display panel. As shown in FIG. 1*c*, the related display panel includes a display panel 1A, the display panel 1A is a monolithic panel, and multiple vibration devices 30 are located on a backlight surface of the display panel 1A. The multiple vibration devices 30 can drive the display panel 1A to vibrate and emit sound, and the effective listening range B of the related display panel is small.

Figure 1D:
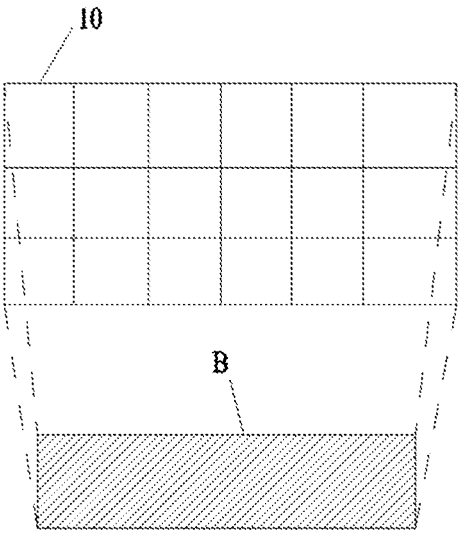
FIG. 1*d* is a schematic diagram of an effective listening range of a display panel of an embodiment of the present disclosure.

FIG. 1*d* is a schematic diagram of an effective listening range of a display panel of an embodiment of the present disclosure. As shown in FIG. 1*d*, the display panel of an embodiment of the present disclosure includes multiple first display units, the multiple first display units are spliced to form a display panel. The first display unit includes at least one first sub-display unit 10, the first sub-display unit 10 has a self-sounding function and has a small area, which can increase the effective listening range B of the display panel.

The display panel of an embodiment of the disclosure can form a large-size spontaneous display panel after splicing multiple first display units, it can be used in TV, cinema and other scenes. Through the self-sounding function of the multiple first display units 100, it can realize in-screen sounding and fine zoning sounding, increase the effective listening range of the display panel, ensure the accuracy of audio-video positioning, and solve the problem of audio-video separation.

In an exemplary implementation, the display panel of the present disclosure embodiment further includes a partition structure 40, the partition structure 40 is located at least one side of the first sub-display panel 1 in the first sub-display unit 10. The partition structure 40 is configured to isolate the first sub-display panel 1 from the other sub-display panel. For example, the partition structure 40 is located between adjacent first sub-display panels 1, and the partition structure 40 is configured to isolate the first sub-display panel 1 from an adjacent first sub-display panel 1, as shown in FIG. 1*a*; alternatively, the partition structure 40 is located between the first sub-display panel 1 and the adjacent second sub-display panel 2, and the partition structure 40 is configured to isolate the first sub-display panel 1 from an adjacent second sub-display panel 2, as shown in FIG. 1*b*. When the first sub-display panel 1 vibrates and sounds, the partition structure 40 can prevent the vibration of the first sub-display panel 1 from being transmitted to other sub-display panels, thus ensuring that the first sub-display panel 1 can vibrate independently and solving the problem of sound channel crosstalk.

In an exemplary implementation, the partition structure 40 is a slot. The slot may be located between the first sub-display panel 1 and other sub-display panels. For example, the slot is provided between two adjacent first sub-display panels 1, the slot between the two adjacent first sub-display panels 1 may be 0.05 mm to 0.5 mm, and for example, the slot between the two adjacent first sub-display panels 1 may be 0.1 mm, as shown in FIG. 1*a*. Alternatively, the slot is provided between the first sub-display panel 1 and the adjacent second sub-display panel 2, the slot between the first sub-display panel 1 and the adjacent second sub-display panel 2 may be 0.05 mm to 0.5 mm, and, for example, the slot between the first sub-display panel 1 and the adjacent second sub-display panel 2 may be 0.1 mm, as shown in FIG. 1*b*.

In some implementations, the partition structure 40 may be made of a flexible material, and the partition structure 40 may be connected with a circumference edge of the first sub-display panel 1, for example, the partition structure 40 may be connected with the circumference edge of the first sub-display panel 1 in a fixed manner, such as bonding.

In an exemplary implementation, both the first sub-display panel 1 and the second sub-display panel 2 may be any kind of flat panel display panel or curved surface display panel, such as a liquid crystal display panel, an organic light emitting display panel, a quantum dot light emitting display panel, a miniature light emitting diode display panel, or an electrophoretic display panel. Both the first sub-display panel 1 and the second sub-display panel 2 may be a flexible display panel. For example, each of the first sub-display panel 1 and the second sub-display panels 2 may be a flexible light emitting display panel, a flexible electrophoretic display panel, a flexible electro wetting display panel, a flexible miniature light emitting diode display panel, or a flexible quantum dot light emitting display panel, but an implementation of the present disclosure is not limited thereto.

In an exemplary implementations, the first sub-display panel 1 and the second sub-display panel 2 may each include a base substrate, a pixel circuit layer provided on the base substrate, and a light emitting structure layer provided on and connected with the pixel circuit layer, the pixel circuit layer may include a thin film transistor and a storage capacitor, and the light emitting structure layer may include an anode electrode, a cathode electrode, and a light emitting layer. The thin film transistor may include a gate electrode, a gate insulation layer, a semiconductor layer, a source electrode, and a drain electrode. The semiconductor layer of the thin film transistor may include silicon, such as amorphous silicon (a-Si), polycrystalline silicon (poly-Si) or low temperature polycrystalline silicon or may include an oxide, such as indium gallium zinc oxide (IGZO), but an implementation of the present disclosure is not limited thereto.

In an exemplary implementation, both the first sub-display panel 1 and the second sub-display panel 2 may display an image in a type, such as a top emission type, a bottom emission type, or a double emission type, based on the structure of the pixel circuit layer. In the top emission type, visible light emitted from the light emitting structure layer may illuminate an area of the light emitting structure layer away from the base substrate direction to display an image. In the bottom emission type, visible light emitted from the light emitting structure layer may illuminate an area of the light emitting structure layer close to the base substrate direction to display an image.

In an exemplary implementation, at least two first display units are arranged along a first direction to form a display unit row, and in a display unit row, a distance L1 between the sound channel centers of two adjacent first display units in the first direction is:

$$2 \times W \times \tan\left(\frac{\beta}{2}\right)$$

Herein, W is a vertical distance between a sound receiving position and a side surface of the display panel facing the sound receiving position; β is an angle between linear distances from sound channel centers of two adjacent first display units to the sound receiving positions respectively in a display unit row, and the β is greater than 2.4 degrees.

In an exemplary implementation, at least two first display units are arranged along a second direction to form a display unit column, and in a display unit column, a distance L2 between the sound channel centers of two adjacent first display units in the second direction is:

$$2 \times W \times \tan\left(\frac{\alpha}{2}\right)$$

Herein, the first direction is different from the second direction; W is a vertical distance between the sound receiving position and a side surface of the display panel facing the sound receiving position; α is an angle between linear distances from sound channel centers of two adjacent first display units to the sound receiving position respectively in a display unit column, the α is greater than 3.4 degrees.

In an exemplary implementation, the sound channel center of the first display unit may be a geometric center of the first display unit; for example, the first display unit includes two first sub-display units, the two first sub-display units configured to input the identical audio driving signal, and the sound channel center of the first display unit is a geometric center of a pattern formed by the two first sub-display units. Alternatively, the sound channel center of the first display unit may be a geometric center of a first sub-display unit of the first display unit. For example, the first display unit includes a first sub-display unit a and a first sub-display unit b, the first sub-display unit a is configured to input a full frequency audio driving signal, the first sub-display unit b is configured to input a low frequency audio driving signal, and the sound channel center of the first display unit may be a geometric center of a pattern of the first sub-display unit a.

FIG. 2 is a first front view of a display panel of an embodiment of the present disclosure. In an exemplary implementation, as shown in FIG. 2*a*, the first display unit 100 includes the first sub-display unit 10, and the second display unit 200 includes the second sub-display unit 20. Multiple first display units 100 and multiple second display units 200 are arranged along the first direction X to form a display unit row. In a display unit row, two second display units 200 arranged along the first direction X are provided between two adjacent first display units 100.

In some embodiments, other numbers of second display units, for example, two, three, four or the like number of second display units may also be provided between two adjacent first display units in a display unit row. However, an implementation of the present disclosure is not limited thereto.

Figure 2A:
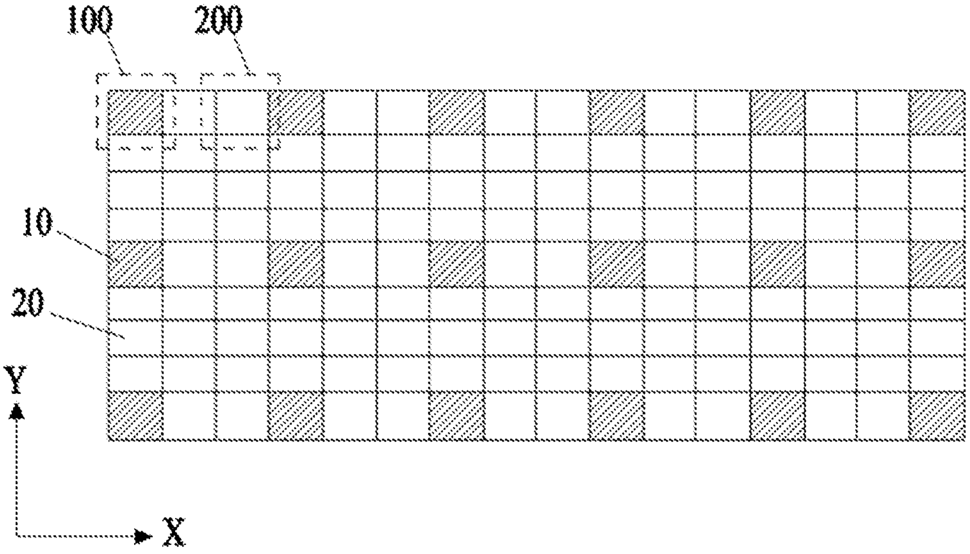
FIG. 2*a* is a first front view of a display panel of an embodiment of the present disclosure.
Figure 2B:
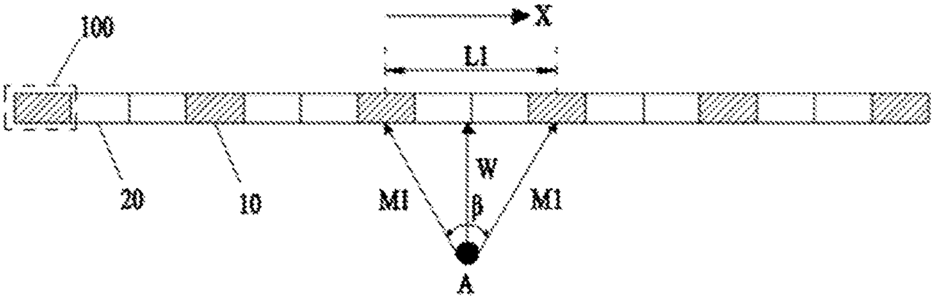
FIG. 2*b* is a first top view of a display panel of an embodiment of the present disclosure.

FIG. 2*b* is a first top view of a display panel of an embodiment of the present disclosure. In an exemplary implementation, as shown in FIG. 2*b*, in a display unit row, the distance L1 of the sound channel centers of two adjacent first display units 100 in the first direction X is:

$$2 \times W \times \tan\left(\frac{\beta}{2}\right)$$

Herein, the sound channel center of the first display unit 100 is the geometric center of the first sub-display unit 10, and W is a vertical distance between the sound receiving position A and a side surface of the display panel facing the sound receiving position A; β is an angle between the linear distances M1 from the sound channel centers of two adjacent first display units 100 to the sound receiving position A respectively in a display unit row. β is greater than 2.4 degrees, for example, β is greater than 2.4 degrees and less than 17 degrees.

Specifically, take the vertical distance W between the sound receiving position A and a side surface of the display panel facing the sound receiving position A is 2n as an example. In a display unit row, the distance L1 in the first direction X of the sound channel centers of two adjacent first display units 100 is:

$$4n \times \tan\left(\frac{\beta}{2}\right)$$

By controlling the distance L1 between the sound channel centers of two adjacent first display units 100 in a display unit row, the display panel of an embodiment of the present disclosure realizes the effect of sound and picture integration without increasing the cost.

In an exemplary implementation, as shown in FIG. 2*a*, the multiple first display units 100 and the multiple second display units 200 are arranged along the second direction Y to form the display unit column. In a display unit column, three second display units 200 arranged along the second direction Y are provided between two adjacent first display units 100. Wherein, the first direction X is different from the second direction Y, for example, the first direction X is perpendicular to the second direction Y.

In some embodiments, other numbers of second display units, for example, one, two, four, or the like number of second display unit(s), may also be provided between two adjacent first display units in a display unit column. However, an implementation of the present disclosure is not limited thereto.

Figure 2C:
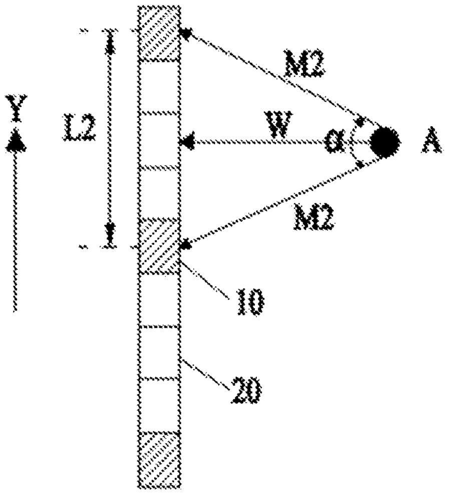
FIG. 2*c* is a first left view of a display panel of an embodiment of the present disclosure.

FIG. 2*c* is a first left view of a display panel of an embodiment of the present disclosure. In an exemplary embodiment, as shown in FIG. 2*c*, in a display unit column, the distance L2 of the sound channel centers of two adjacent first display units 100 in the second direction Y is:

$$2 \times W \times \tan\left(\frac{\alpha}{2}\right)$$

Herein, the sound channel center of the first display unit 100 is the geometric center of the first sub-display unit 10, and W is a vertical distance between the sound receiving position A and a side surface of the display panel facing the sound receiving position A; α is an angle between linear distances M2 from the sound channel centers of two adjacent first display units 100 to the sound receiving position A respectively in a display unit column. α is greater than 3.4 degrees, for example, α is greater than 3.4 degrees and less than 17 degrees.

Specifically, take the vertical distance W between the sound receiving position A and a side surface of the display panel facing the sound receiving position A is 2n as an example. In a display unit column, the distance L2 in the second direction Y of the sound channel centers of two adjacent first display units 100 is:

$$4n \times \tan\left(\frac{\alpha}{2}\right)$$

By controlling the distance L2 between the sound channel centers of two adjacent first display units 100 in a display unit column, the display panel of the embodiment of the present disclosure realizes the effect of sound and picture integration without increasing the cost.

In an exemplary implementation, the first display unit and the second display unit may take a regular or irregular shape, such as a rectangle, a diamond, a circle, an oval, a polygon, or the like. For example, both the first display unit 100 and the second display unit 200 may employ a rectangle, as shown in FIG. 2*a*.

In an exemplary implementation, the first sub-display unit and the second sub-display unit may take a regular or irregular shape, such as a rectangle, a diamond, a circle, an oval, a polygon, or the like. For example both the first sub-display unit 10 and the second sub-display unit 20 may employ a rectangle, as shown in FIG. 2*a*.

Figure 2D:
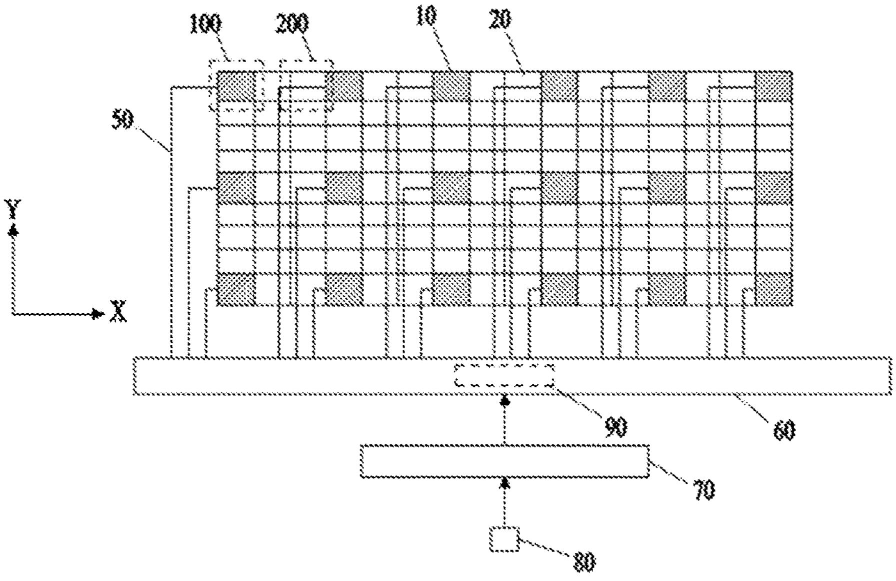
FIG. 2*d* is a schematic diagram of a signal line leading out in a display panel of an embodiment of the present disclosure.

FIG. 2*d* is a schematic diagram of a signal line leading out in a display panel of an embodiment of the present disclosure. In an exemplary implementation, as shown in FIG. 2*d*, each of the multiple first display units 100 is connected with a driving signal line 50, the driving signal line 50 is configured to provide an audio driving signal to the first display unit 100 connected thereto. After the first display unit 100 receives the audio driving signal, one or more vibration device(s) 30 in the first display unit 100 is (are) driven to vibrate, so that the first display unit 100 outputs sound.

In an exemplary implementation, a first display unit 100 may include multiple first sub-display units, the multiple first sub-display units may be connected with different driving signal lines 50, and different audio driving signals may be provided to the multiple first sub-display units through the different driving signal lines 50. For example, a first display unit 100 may include a first sub-display unit a and a first sub-display unit b, the first sub-display unit a is connected with a first driving signal line, and the first sub-display unit b is connected with a second driving signal line, wherein the first driving signal line inputs a full frequency audio driving signal to the first sub-display unit a, and the second driving signal line inputs a low frequency audio driving signal to the first sub-display unit b.

The driving signal line 50 connected with each first display unit 100 in the display panel of an embodiment of the present disclosure is independently led out, and the driving signal line 50 can independently control the amplitude or phase of its input signal, thereby controlling the audio-video positioning. Different audio driving signals may be adjusted by the driving signal line 50, and different audio driving signals, for example, different sound pressures and frequencies, may be input to different first display units 100, so that a picture displayed on a display panel obtains an effect of a three-dimensional depth of field.

In an exemplary implementation, as shown in FIG. 2*d*, the display panel of an embodiment of the present disclosure further includes an audio signal processor 60, a sound card 70, and an audio source 80, an output port of the audio signal processor 60 is connected with input ports of multiple driving signal lines 50; an input port of the audio signal processor 60 is connected with an output port of the sound card 70; an input port of the sound card 70 is connected with the audio source 80; an output port of the audio signal processor 60 is connected with an audio interface, and the input ports of the multiple driving signal lines 50 are connected with the output ports of the audio signal processor 60 through the audio interface.

In an exemplary implementation, as shown in FIG. 2*d*, the display panel of an embodiment of the present disclosure further includes a gain adjuster 90, the gain adjuster 90 is configured to amplify the audio driving signal provided to the first display unit 100 to increase the strength of the audio driving signal. The gain adjuster 90 may be integrated in the audio signal processor 60 so that the attenuation proportion is small when the audio driving signal amplified by the gain adjuster 90 is transmitted to the first display unit 100.

In some embodiments, the gain adjuster may also be provided in the second display unit, and the gain adjuster may be connected with the output port of the audio signal processor through an audio interface. However, an implementation of the present disclosure is not limited thereto.

In an exemplary implementation, a first display unit may include multiple first sub-display units, and the multiple first sub-display units may be input the identical audio driving signal, thereby increasing the loudness of the first display unit.

Figure 3A:
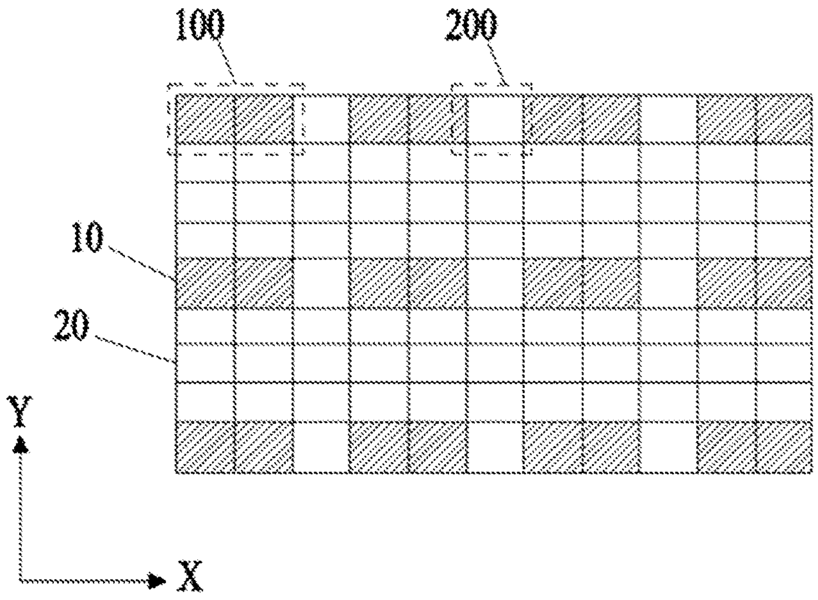
FIG. 3*a* is a second front view of a display panel of an embodiment of the present disclosure.

FIG. 3*a* is a second front view of a display panel of an embodiment of the present disclosure. In an exemplary implementation, as shown in FIG. 3*a*, the first display unit 100 includes two first sub-display units 10 arranged along the first direction X, and the second display unit 200 includes the second sub-display unit 20. Two first sub-display units 10 in one first display unit 100 may input the identical audio driving signal thereby increasing the loudness of the first display unit 100.

In an exemplary implementation, as shown in FIG. 3*a*, two first sub-display units 10 in a first display unit 100 may have the same size and shape. For example, two first sub-display units 10 in a first display unit 100 may each be rectangular, and the two first sub-display units 10 have the same size.

In some embodiments, a first display unit may include other numbers of first sub-display units, for example, a first display unit may include three, four, five, etc. number of first sub-display units. The multiple first sub-display units in a first display unit may be arranged in other ways, for example, the multiple first sub-display units in a first display unit may be arranged in the second direction Y, or in a rectangular arrangement, or in a triangular arrangement, or in a polygonal arrangement. However, an implementation of the present disclosure is not limited thereto.

In an exemplary implementation, as shown in FIG. 3*a*, the multiple first display units 100 and the multiple second display units 200 are arranged along the first direction X to form a display unit row. In a display unit row, a second display unit 200 is provided between two adjacent first display units 100.

In some embodiments, other numbers of second display units, for example, two, three, four or the like number of second display units, may also be provided between two adjacent first display units in a display unit row, and multiple second display units provided between two adjacent first display units may be arranged along the first direction X. However, an implementation of the present disclosure is not limited thereto.

Figure 3B:
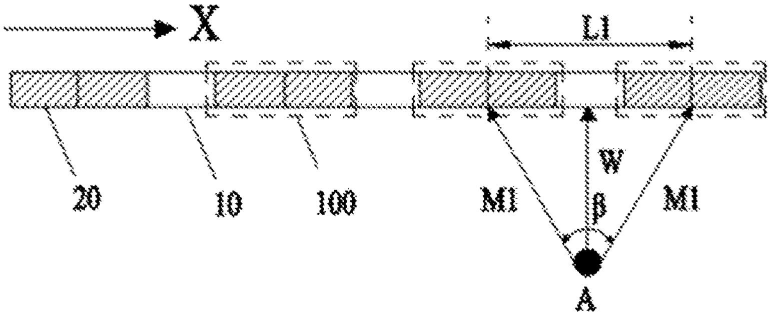
FIG. 3*b* is a second top view of a display panel of an embodiment of the present disclosure.

FIG. 3*b* is a second top view of a display panel of an embodiment of the present disclosure. In an exemplary implementation, as shown in FIG. 3*b*, in a display unit row, the distance L1 of the sound channel centers of two adjacent first display units 100 in the first direction X is:

$$2 \times W \times \tan\left(\frac{\beta}{2}\right)$$

Herein, the sound channel center of the first display unit 100 is the geometric center of the first display unit 100, and W is a vertical distance between the sound receiving position A and a side surface of the display panel facing the sound receiving position A; B is an angle between linear distances M1 from the sound channel centers of two adjacent first display units 100 to the sound receiving position A respectively in a display unit row. β is greater than 2.4 degrees, for example, β is greater than 2.4 degrees and less than 17 degrees.

Specifically, take the vertical distance W between the sound receiving position A and a side surface of the display panel facing the sound receiving position A is 2n as an example. In a display unit row, the distance L1 in the first direction X of the sound channel centers of two adjacent first display units 100 is:

$$4n \times \tan\left(\frac{\beta}{2}\right)$$

By controlling the distance L1 between the sound channel centers of two adjacent first display units 100 in a display unit row, the display panel of an embodiment of the present disclosure realizes the effect of sound and picture integration without increasing the cost.

In an exemplary implementation, as shown in FIG. 3*a*, the multiple first display units 100 and the multiple second display units 200 are arranged along the second direction Y to form a display unit column. In a display unit column, three second display units 200 arranged along the second direction Y are provided between two adjacent first display units 100. Wherein, the first direction X is different from the second direction Y, for example, the first direction X is perpendicular to the second direction Y.

In some embodiments, other numbers of second display units, for example, one, two, four, or the like number of second display unit(s), may also be provided between two adjacent first display units in a display unit column. However, an implementation of the present disclosure is not limited thereto.

Figure 3C:
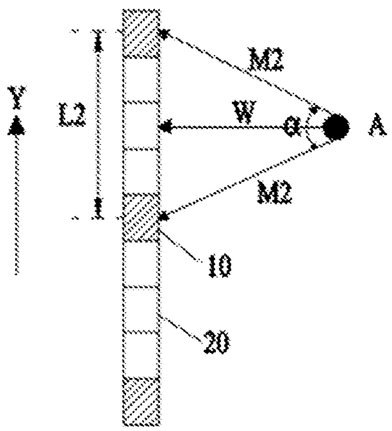
FIG. 3*c* is a second left view of a display panel of an embodiment of the present disclosure.

FIG. 3*c* is a second left view of a display panel of an embodiment of the present disclosure. In an exemplary implementation, as shown in FIG. 3*c*, in a display unit column, the distance L2 of the sound channel centers of two adjacent first display units 100 in the second direction Y is:

Herein, the sound channel center of the first display unit 100 is the geometric center of the first display unit 100, and W is a vertical distance between the sound receiving position A and a side surface of the display panel facing the sound receiving position A; α is an angle between linear distances M2 from the sound channel centers of two adjacent first display units 100 to the sound receiving position A respectively in a display unit column. α is greater than 3.4 degrees, for example, α is greater than 3.4 degrees and less than 17 degrees.

Specifically, take the vertical distance W between the sound receiving position A and a side surface of the display panel facing the sound receiving position A is 2n as an example. In a display unit column, the distance L2 in the second direction Y of the sound channel centers of two adjacent first display units 100 is:

$$4n \times \tan\left(\frac{\alpha}{2}\right)$$

By controlling the distance L2 between the sound channel centers of two adjacent first display units 100 in a display unit column, the display panel of an embodiment of the present disclosure realizes the effect of sound and picture integration without increasing the cost.

In an exemplary embodiment, a first display unit may include multiple first sub-display units, and the multiple first sub-display units in a first display unit may be input different audio driving signals, thereby compensating a deficiency of loudness of the first display unit in a certain frequency band to improve the loudness of the first display unit 100. For example, the first display unit may include a first sub-display unit a and a first sub-display unit b, the first sub-display unit a is configured to be input a full frequency audio driving signal, the first sub-display unit b is configured to be input a low frequency audio driving signal, and the first sub-display unit b can compensate a deficiency of loudness of the first display unit in a low frequency band to improve the low frequency loudness of the first display unit; alternatively, the first display unit may include a first sub-display unit a, a first sub-display unit b and a first sub-display unit c, the first sub-display unit a is configured to be input a full frequency audio driving signal, the first sub-display unit b is configured to be input a low frequency audio driving signal, the first sub-display unit c may be input a high frequency audio driving signal, and the first sub-display unit b may compensate a deficiency of the loudness of the first display unit in a low frequency band, and improve the low frequency loudness of the first display unit; the first sub-display unit c can compensate for a deficiency of loudness of the first display unit in the high frequency band to improve the loudness of the first display unit in the high frequency.

Figure 4A:
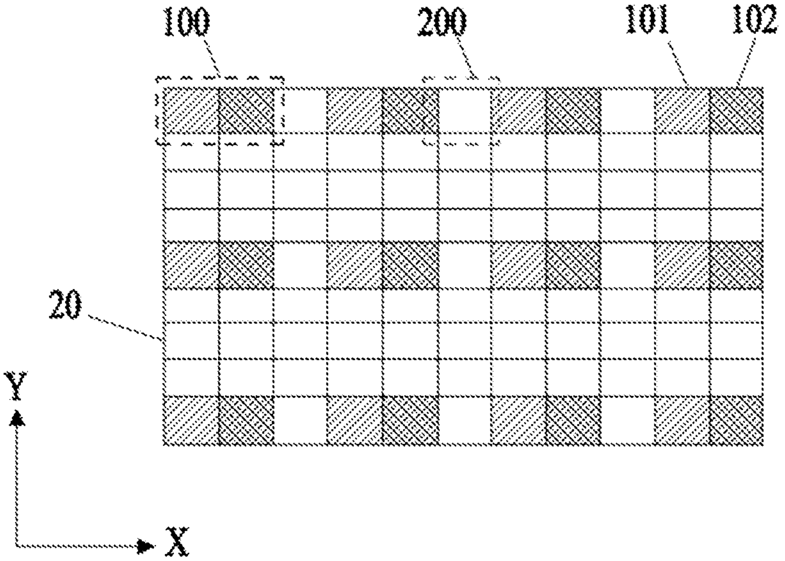
FIG. 4*a* is a third front view of a display panel of an embodiment of the present disclosure.

FIG. 4*a* is a third front view of a display panel of an embodiment of the present disclosure. In an exemplary implementation, as shown in FIG. 4*a*, the first display unit 100 includes a first sub-display unit a101 and a first sub-display unit b102, and the second display unit 200 includes the second sub-display unit 20. The first sub-display unit a101 and the first sub-display unit b102 are arranged along the first direction X, and the first sub-display unit a101 and the first sub-display unit b102 may be input different audio driving signals, so that the first sub-display unit a101 and the first sub-display unit b102 may compensate each other. For example, the audio driving signal may be input to the first sub-display unit a101 and the first sub-display unit b102 in frequency division to compensate for a deficiency of loudness in a certain frequency band of the first display unit 100.

In an exemplary implementation, as shown in FIG. 4*a*, the first sub-display unit a101 is configured to be input a full frequency audio driving signal including at least a low frequency audio driving signal, an intermediate frequency audio driving signal, and a high frequency audio driving signal. For example, the full frequency audio driving signal includes an audio driving signal of 200 Hertz, an audio driving signal below 200 Hertz, and an audio driving signal above 200 Hertz. The first sub-display unit b102 is configured to be input a low frequency audio driving signal, exemplary, the low frequency audio driving signal may include an audio driving signal below 200 Hz. The first sub-display unit b102 is capable of compensating the loudness of the first display unit 100 at the low frequency audio driving signal, for example, increasing the loudness of the first display unit 100 by 6 dB when the low frequency audio driving signal is input.

Figure 4B:
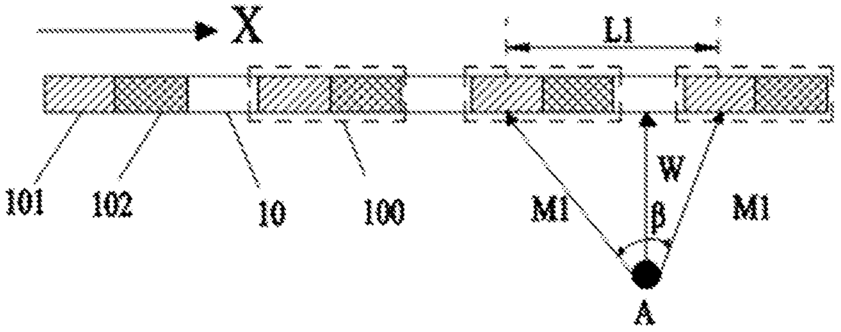
FIG. 4*b* is a third top view of a display panel of an embodiment of the present disclosure.
Figure 4C:
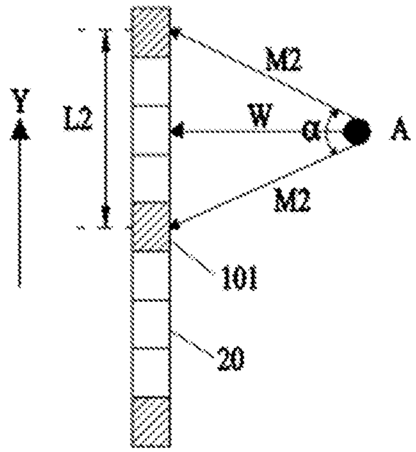
FIG. 4*c* is a third left view of a display panel of an embodiment of the present disclosure.
Figure 4D:
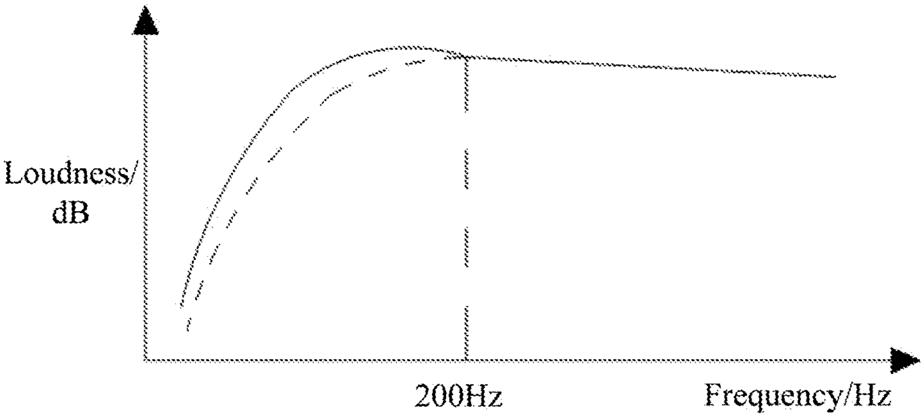
FIG. 4*d* is a first graph of an audio frequency of a first display unit in a display panel of an embodiment of the present disclosure.

FIG. 4*d* is a first graph of an audio frequency of a first display unit in a display panel of an embodiment of the present disclosure. Herein, in FIG. 4*d*, the x-axis is the frequency value of the audio driving signal input to the first display unit, and the y-axis is the loudness of the sound emitted by the first display unit. The dashed line curve is an audio curve of the first display unit before compensation, the first display unit only includes a first sub-display unit a before compensation, and the first sub-display unit a is configured to be input a full frequency audio driving signal; the solid curve is an audio curve of the first display unit after compensation, the first display unit includes a first sub-display unit a and a first sub-display unit b after compensation, the first sub-display unit a is configured to be input a full frequency audio driving signal, the first sub-display unit b is configured to be input a low frequency audio driving signal, and the low frequency audio driving signal includes an audio driving signal lower than 200 Hz. As shown in FIG. 4*d*, the loudness of the first display unit after compensation is higher than the loudness of the first display unit before compensation in the frequency band below 200 hertz, and the first sub-display unit b may improve the loudness of the low frequency band in the first display unit.

In an exemplary implementation, as shown in FIG. 4*a*, the size and shape of the first sub-display unit a101 and the first sub-display unit b102 may be the same. For example, both the first sub-display unit a101 and the first sub-display unit b102 may be rectangular, and the first sub-display unit a101 and the first sub-display unit b102 have the same size.

In some embodiments, a first display unit may include other numbers of first sub-display units a and first sub-display units b, for example, a first display unit may include two, three, four, five, or the like number of first sub-display units a and two, three, four, five, or the like number of first sub-display units b. The first sub-display unit a and the first sub-display unit b in a first display unit may be arranged in other ways, for example, the first sub-display unit a and the first sub-display unit b in the first display unit may be arranged long the second direction Y, or in a rectangular arrangement, or in a triangular arrangement, or in a polygonal arrangement. However, an implementation of the present disclosure is not limited thereto.

In an exemplary implementation, as shown in FIG. 4*a*, the multiple first display units 100 and the multiple second display units 200 are arranged along the first direction X to form a display unit row. In a display unit row, a second display unit 200 is provided between two adjacent first display units 100.

In some embodiments, other numbers of second display units, for example, two, three, four or the like number of second display units, may also be provided between two adjacent first display units in a display unit row, and multiple second display units provided between two adjacent first display units may be arranged along the first direction X. However, an implementation of the present disclosure is not limited thereto.

FIG. 4*b* is a third top view of a display panel of an embodiment of the present disclosure. In an exemplary implementation, as shown in FIG. 4*b*, in a display unit row, the distance L1 of the sound channel centers of two adjacent first display units 100 in the first direction X is:

$$2 \times W \times \tan\left(\frac{\beta}{2}\right)$$

Herein, the sound channel center of the first display unit 100 is the geometric center of the first sub-display unit a101 in the first display unit 100, and W is a vertical distance between the sound receiving position A and a side surface of the display panel facing the sound receiving position A; β is an angle between linear distances M1 from the sound channel centers of two adjacent first display units 100 to the sound receiving position A respectively in a display unit row. β is greater than 2.4 degrees, for example, β is greater than 2.4 degrees and less than 17 degrees.

The display panel of an embodiment of the present disclosure determines the sound channel center of the first display unit 100 is the geometric center of the first sub-display unit a101 in the first display unit 100, and the first sub-display unit a101 is input a full frequency audio driving signal, so that the sound directivity is good, thereby improving the sound directivity of the first display unit 100.

Specifically, take the vertical distance W between the sound receiving position A and a side surface of the display panel facing the sound receiving position A is 2n as an example. In a display unit row, the distance L1 in the first direction X of the sound channel centers of two adjacent first display units 100 is:

$$4n \times \tan\left(\frac{\beta}{2}\right)$$

By controlling the distance L1 between the sound channel centers of two adjacent first display units 100 in a display unit row, the display panel of an embodiment of the present disclosure realizes the effect of sound and picture integration without increasing the cost.

In an exemplary implementation, as shown in FIG. 4*a*, the multiple first display units 100 and the multiple second display units 200 are arranged along the second direction Y to form a display unit column. In a display unit column, three second display units 200 arranged along the second direction Y are provided between two adjacent first display units 100. Wherein, the first direction X is different from the second direction Y, for example, the first direction X is perpendicular to the second direction Y.

In some embodiments, other numbers of second display units, for example, one, two, four, or the like number of second display unit(s), may also be provided between two adjacent first display units in a display unit column. However, an implementation of the present disclosure is not limited thereto.

FIG. 4*c* is a third left view of a display panel of an embodiment of the present disclosure. In an exemplary implementation, as shown in FIG. 4*c*, in a display unit column, the distance L2 of the sound channel centers of two adjacent first display units 100 in the second direction Y is:

$$2 \times W \times \tan\left(\frac{\alpha}{2}\right)$$

Herein, the sound channel center of the first display unit 100 is the geometric center of the first sub-display unit a101 in the first display unit 100, and W is a vertical distance between the sound receiving position A and a side surface of the display panel facing the sound receiving position A; α is an angle between linear distances M2 from the sound channel centers of two adjacent first display units 100 to the sound receiving position A respectively in a display unit column, . . . α is greater than 3.4 degrees, for example, α is greater than 3.4 degrees and less than 17 degrees.

Specifically, take the vertical distance W between the sound receiving position A and a side surface of the display panel facing the sound receiving position A is 2n as an example. In a display unit column, the distance L2 in the second direction Y of the sound channel centers of two adjacent first display units 100 is:

$$4n \times \tan\left(\frac{\alpha}{2}\right)$$

By controlling the distance L2 between the sound channel centers of two adjacent first display units 100 in a display unit column, the display panel of an embodiment of the present disclosure realizes the effect of sound and picture integration without increasing the cost.

Figure 5A:
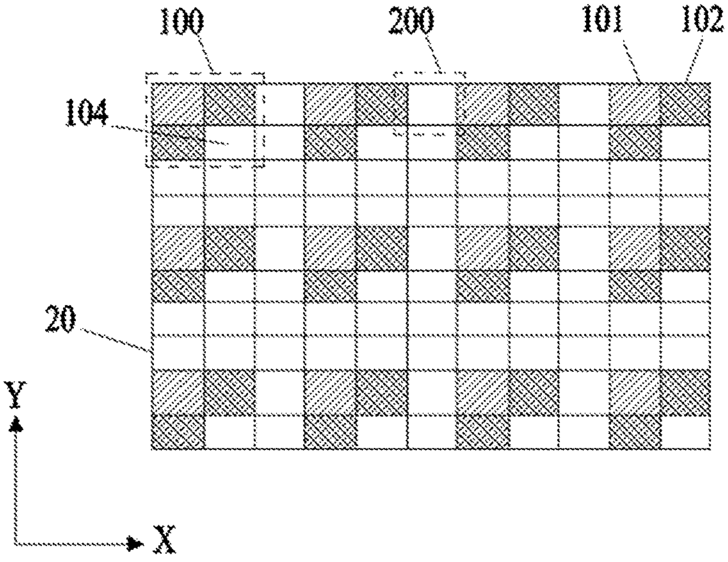
FIG. 5*a* is a fourth front view of a display panel of an embodiment of the present disclosure.

FIG. 5*a* is a fourth front view of a display panel of an embodiment of the present disclosure. In an exemplary implementation, as shown in FIG. 5*a*, the first display unit 100 includes the first sub-display unit a101, two first sub-display units b102, and a normal sub-display unit 104, and the second display unit 200 includes the second sub-display unit 20. The first sub-display unit a101, two first sub-display units b102, and a normal sub-display unit 104 are arranged in a rectangular shape. In the first display unit 100, the first sub-display unit a101 and the first sub-display unit b102 are arranged along the first direction X, and the first sub-display unit a101 and another first sub-display unit b102 are arranged along the second direction Y. The configuration of the normal sub-display unit 104 may be the same as that of the second sub-display unit 20, the normal sub-display unit 104 is not provided with a vibration device 30, and the normal sub-display unit 104 does not have a sounding function.

In an exemplary implementation, the first sub-display unit a101 may be input a medium and high frequency audio driving signal, the medium and high frequency audio driving signal include an intermediate frequency audio driving signal and a high frequency audio driving signal, the intermediate frequency audio driving signal may include an audio driving signal higher than or equal to 200 Hz and lower than or equal to 10 kHz, and the high frequency audio driving signal may include an audio driving signal higher than 10 kHz. The first sub-display unit b102 may be input a low frequency audio driving signal, and the low frequency audio driving signal may include an audio driving signal below 200 Hz. The two first sub-display units b102 are capable of compensating the loudness of the first display unit 100 in a low frequency band and increasing the loudness of the first display unit 100 when the first display unit 100 is input the low frequency audio driving signal, for example, increasing the loudness of the first display unit 100 by 6 dB when the first display unit 100 is input the low frequency audio driving signal.

In an exemplary implementation, as shown in FIG. 5*a*, the size and shape of the first sub-display unit a101 and the first sub-display unit b102 may be the same. For example, both the first sub-display unit a101 and the first sub-display unit b102 may be rectangular, and the first sub-display unit a101 and the first sub-display unit b102 have the same size.

In some embodiments, the first display unit may include other numbers of first sub-display units a, first sub-display units b and first sub-display units c, for example, a first display unit may include two, three, four, five, or the like number of first sub-display units a, two, three, four, five, or the like number of first sub-display units b, and two, three, four, five, or the like number of first sub-display units c. The first sub-display unit a, the first sub-display unit b and the first sub-display unit c of the first display unit may be arranged in other ways, for example, the first sub-display unit a, the first sub-display unit b, and the first sub-display unit c of the first display unit may be arranged along the second direction Y, or in a rectangular arrangement, or in a triangular arrangement, or in a polygonal arrangement. However, an implementation of the present disclosure is not limited thereto.

In an exemplary implementation, as shown in FIG. 5*a*, the multiple first display units 100 and the multiple second display units 200 are arranged along the first direction X to form a display unit row. In a display unit row, a second display unit column is provided between two adjacent first display units 100, and the second display unit column includes two second sub-display units 20 arranged along the second direction Y.

In some embodiments, in a display unit row, other numbers of second display unit columns may also be provided between two adjacent first display units, for example, two, three, four, or the like number of second display unit columns may be provided, and multiple second display unit columns provided between two adjacent first display units may be arranged along the first direction X. However, an implementation of the present disclosure is not limited thereto.

Figure 5B:
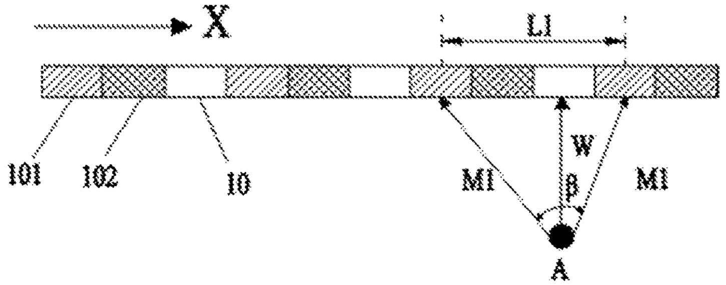
FIG. 5*b* is a fourth top view of a display panel of an embodiment of the present disclosure.

FIG. 5*b* is a fourth top view of a display panel of an embodiment of the present disclosure. In an exemplary implementation, as shown in FIG. 5*b*, in the display unit row, the distance L1 of the sound channel centers of two adjacent first display units 100 in the first direction X is:

$$2 \times W \times \tan\left(\frac{\beta}{2}\right)$$

Herein, the sound channel center of the first display unit 100 is the geometric center of the first sub-display unit a101 in the first display unit 100, and W is a vertical distance between the sound receiving position A and a side surface of the display panel facing the sound receiving position A; β is an angle between linear distances M1 from the sound channel centers of two adjacent first display units 100 to the sound receiving position A respectively in a display unit row. β is greater than 2.4 degrees, for example, β is greater than 2.4 degrees and less than 17 degrees.

The display panel of an embodiment of the present disclosure determines the sound channel center of the first display unit 100 is the geometric center of the first sub-display unit a101 in the first display unit 100, and the first sub-display unit a101 is input the medium and high frequency audio driving signals, so that the sound directivity is good, thereby improving the sound directivity of the first display unit 100.

Specifically, take the vertical distance W between the sound receiving position A and a side surface of the display panel facing the sound receiving position A is 2n as an example. In a display unit row, the distance L1 in the first direction X of the sound channel centers of two adjacent first display units 100 is:

$$4n \times \tan\left(\frac{\beta}{2}\right)$$

By controlling the distance L1 between the sound channel centers of two adjacent first display units 100 in a display unit row, the display panel of an embodiment of the present disclosure realizes the effect of sound and picture integration without increasing the cost.

In an exemplary implementation, as shown in FIG. 5*a*, the multiple first display units 100 and the multiple second display units 200 are arranged along the second direction Y to form a display unit column. In a display unit column, two second display unit rows arranged along the second direction Y are provided between two adjacent first display units 100, and the second display unit rows include two second sub-display units 20 arranged along the first direction X.

In some embodiments, other numbers of second display unit rows, for example, one, three, four, or the like number of second display unit rows, may also be provided between two adjacent first display units in a display unit column. However, an implementation of the present disclosure is not limited thereto.

Figure 5C:
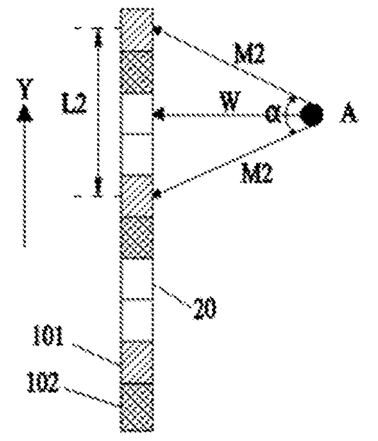
FIG. 5*c* is a fourth left view of a display panel of an embodiment of the present disclosure.

FIG. 5*c* is a fourth left view of a display panel of an embodiment of the present disclosure. In an exemplary implementation, as shown in FIG. 5*c*, in a display unit column, the distance L2 of the sound channel centers of two adjacent first display units 100 in the second direction Y is:

$$2 \times W \times \tan\left(\frac{\alpha}{2}\right)$$

Herein, the sound channel center of the first display unit 100 is the geometric center of the first sub-display unit a101 in the first display unit 100, and W is the vertical distance between the sound receiving position A and a side surface of the display panel facing the sound receiving position A; α is an angle between linear distances M2 from the sound channel centers of two adjacent first display units 100 to the sound receiving position A respectively in a display unit column . . . α is greater than 3.4 degrees, for example, α is greater than 3.4 degrees and less than 17 degrees.

Specifically, take the vertical distance W between the sound receiving position A and a side surface of the display panel facing the sound receiving position A is 2n as an example. In a display unit column, the distance L2 in the second direction Y of the sound channel centers of two adjacent first display units 100 is:

$$4n \times \tan\left(\frac{\alpha}{2}\right)$$

By controlling the distance L2 between the sound channel centers of two adjacent first display units 100 in a display unit column, the display panel of an embodiment of the present disclosure realizes the effect of sound and picture integration without increasing the cost.

Figure 6A:
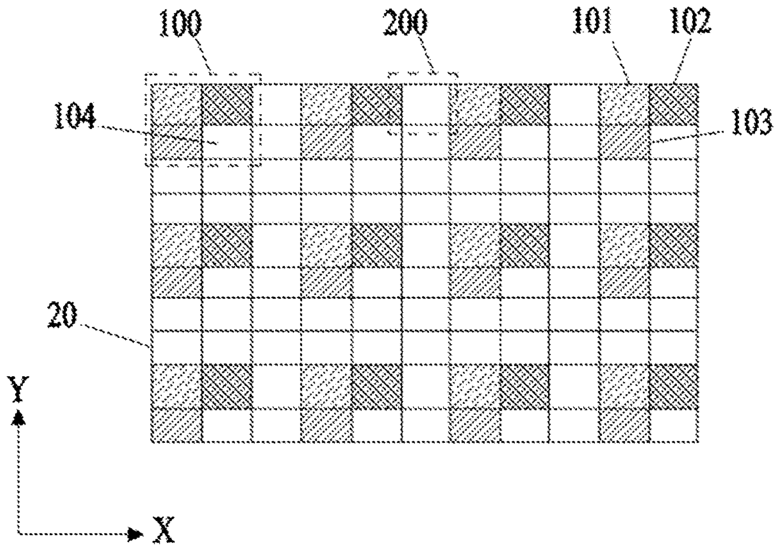
FIG. 6*a* is a fifth front view of a display panel of an embodiment of the present disclosure.

FIG. 6*a* is a fifth front view of a display panel of an embodiment of the present disclosure. In an exemplary implementation, as shown in FIG. 6*a*, a first display unit 100 includes a first sub-display unit a101, a first sub-display unit b102, a first sub-display unit c103, and a normal sub-display unit 104, and a second display unit 200 includes a second sub-display unit 20. The first sub-display unit a101, the first sub-display unit b102, the first sub-display unit c103, and the normal sub-display unit 10 are arranged in a rectangular shape. In the first display unit 100, the first sub-display unit a101 and the first sub-display unit b102 are arranged along the first direction X, the first sub-display unit a101 and the first sub-display unit c103 are arranged along the second direction Y, and the first sub-display unit c103 and the normal sub-display unit 104 are arranged along the first direction X. The configuration of the normal sub-display unit 104 may be the same as that of the second sub-display unit 20, the normal sub-display unit 104 is not provided with the vibration device 30, and the normal sub-display unit 104 does not have a sounding function.

In an exemplary implementation, the first sub-display unit a101 may be input a full frequency audio driving signal, the first sub-display unit b102 may be input a low frequency audio driving signal, and the first sub-display unit c103 may be input a high frequency audio driving signal. The low frequency audio driving signal may include an audio driving signal below 200 Hz, and the high frequency audio driving signal may include an audio driving signal above 10 kHz. The first sub-display unit b102 is capable of compensating the loudness of the first display unit 100 in a low frequency band and increasing the loudness of the first display unit 100 when the first display unit 100 is input the low frequency audio driving signal, for example, increasing the loudness of the first display unit 100 by 6 dB when the first display unit 100 is input the low frequency audio driving signal. The first sub-display unit c103 is capable of compensating the loudness of the first display unit 100 in a high frequency band and increasing the loudness of the first display unit 100 when the first display unit 100 is input the high frequency audio driving signal, for example, increasing the loudness of the first display unit 100 by 6 dB when the first display unit 100 is input the high frequency audio driving signal.

Figure 6B:
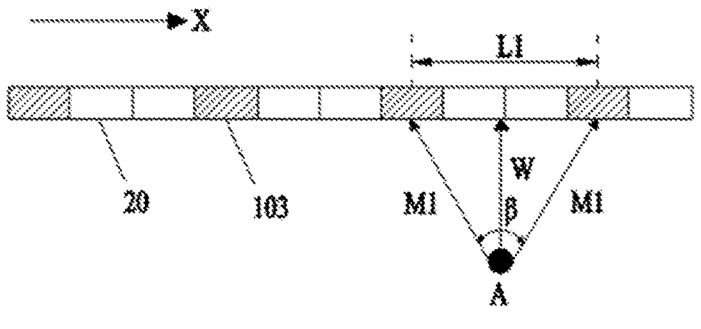
FIG. 6*b* is a bottom view of a display panel of an embodiment of the present disclosure.
Figure 6C:
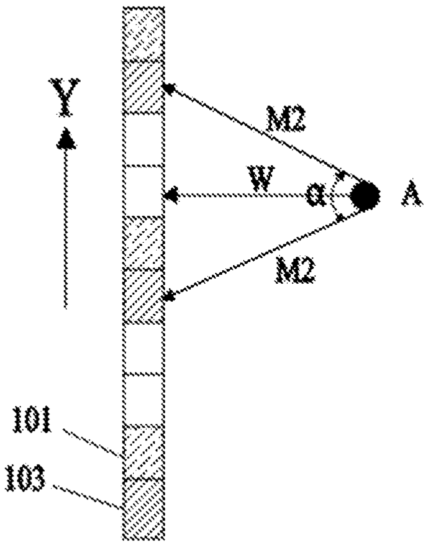
FIG. 6*c* is a fifth left view of a display panel of an embodiment of the present disclosure.
Figure 6D:
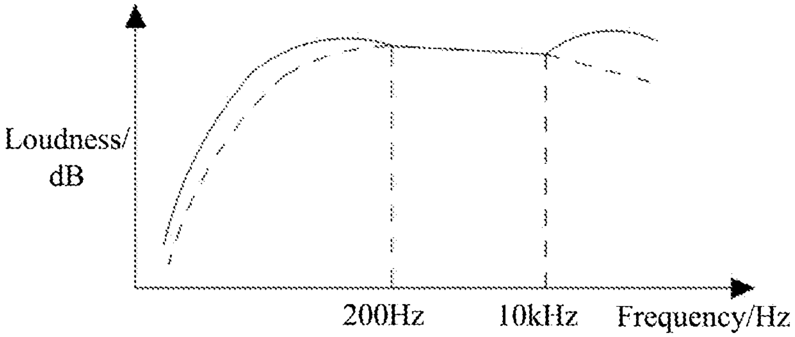
FIG. 6*d* is a second graph of an audio frequency of a first display unit in a display panel of an embodiment of the present disclosure.

FIG. 6*d* is a second graph of an audio frequency of a first display unit in a display panel of an embodiment of the present disclosure. Herein, in FIG. 6*d*, the x-axis is the frequency value of the audio driving signal input to the first display unit, and the y-axis is the loudness of the sound emitted by the first display unit. The dashed line curve is an audio curve of the first display unit before compensation, the first display unit only includes a first sub-display unit a before compensation, and the first sub-display unit a is configured to be input a full frequency audio driving signal; the solid curve is an audio curve of the first display unit after compensation, the first display unit includes a first sub-display unit a, a first sub-display unit b, and a first sub-display unit c103 after compensation, the first sub-display unit a is configured to be input a full frequency audio driving signal, the first sub-display unit b is configured to be input a low frequency audio driving signal, the first sub-display unit c103 is configured to be input a high frequency audio driving signal, the low frequency audio driving signal includes an audio driving signal lower than 200 Hz, and the high frequency audio driving signal may include an audio driving signal higher than 10 kHz. As shown in FIG. 6*d*, the loudness of the first display unit after compensation is higher than the loudness of the first display unit before compensation in a frequency band below 200 hertz, and the first sub-display unit b can improve the loudness of the low frequency band in the first display unit. The loudness of the first display unit after compensation is higher than the loudness of the first display unit before compensation in a frequency band higher than 10 kHz, and the first sub-display unit b can improve the loudness of the high frequency band in the first display unit.

In an exemplary implementation, as shown in FIG. 6*a*, the sizes and shapes of the first sub-display unit a101, the first sub-display unit b102, and the first sub-display unit c103 may be the same. For example, the first sub-display unit a101, the first sub-display unit b102, and the first sub-display unit c103 may all be rectangular, and the sizes of the first sub-display unit a101, the first sub-display unit b102, and the first sub-display unit c103 are the same.

In some embodiments, the first display unit may include other numbers of first sub-display units a, first sub-display units b, and first sub-display units c, for example, a first display unit may include two, three, four, five, or the like number of first sub-display units a, two, three, four, five, or the like number of first sub-display units b, and two, three, four, five, or the like number of first sub-display units c. The first sub-display unit a, the first sub-display unit b, and the first sub-display unit c of a first display unit may be arranged in other ways, for example, the first sub-display unit a, the first sub-display unit b, and the first sub-display unit c of a first display unit may be arranged along the second direction Y, or in a rectangular arrangement, or in a triangular arrangement, or in a polygonal arrangement. However, an implementation of the present disclosure is not limited thereto.

In an exemplary implementation, as shown in FIG. 6*a*, the multiple first display units 100 and the multiple second display units 200 are arranged along the first direction X to form a display unit row. In a display unit row, a second display unit column is provided between two adjacent first display units 100, and the second display unit column includes two second sub-display units 20 arranged along the second direction Y.

In some embodiments, in a display unit row, other numbers of second display unit columns may also be provided between two adjacent first display units, for example, two, three, four, or the like number of second display unit columns may be provided, and multiple second display unit columns provided between two adjacent first display units may be arranged along the first direction X. However, an implementation of the present disclosure is not limited thereto.

FIG. 6*d* is a second graph of an audio frequency of a first display unit in a display panel of an embodiment of the present disclosure. In an exemplary implementation, as shown in FIG. 6*b*, in a display unit row, the distance L1 of the sound channel centers of two adjacent first display units 100 in the first direction X is:

$$2 \times W \times \tan\left(\frac{\beta}{2}\right)$$

Herein, the sound channel center of the first display unit 100 is the geometric center of the first sub-display unit c103 in the first display unit 100, and W is a vertical distance between the sound receiving position A and a side surface of the display panel facing the sound receiving position A; β is an angle between linear distances M1 from the sound channel centers of two adjacent first display units 100 to the sound receiving position A respectively in a display unit row. β is greater than 2.4 degrees, for example, β is greater than 2.4 degrees and less than 17 degrees.

The display panel of an embodiment of the present disclosure determines the sound channel center of the first display unit 100 as the geometric center of the first sub-display unit c103 in the first display unit 100, and the first sub-display unit c103 is input a high frequency audio driving signal, so that the sound directivity is good, thereby improving the sound directivity of the first display unit 100.

Specifically, take the vertical distance W between the sound receiving position A and a side surface of the display panel facing the sound receiving position A is 2n as an example. In a display unit row, the distance L1 in the first direction X of the sound channel centers of two adjacent first display units 100 is:

$$4n\times\tan\left(\frac{\beta}{2}\right)$$

By controlling the distance L1 between the sound channel centers of two adjacent first display units 100 in a display unit row, the display panel of an embodiment of the present disclosure realizes the effect of sound and picture integration without increasing the cost.

In an exemplary implementation, as shown in FIG. 6*a*, the multiple first display units 100 and the multiple second display units 200 are arranged along the second direction Y to form a display unit column. In a display unit column, two second display unit rows arranged along the second direction Y are provided between two adjacent first display units 100, and the second display unit row includes two second sub-display units 20 arranged along the first direction X.

In some embodiments, other numbers of second display unit rows, for example, one, three, four, or the like number of second display unit row(s), may also be provided between two adjacent first display units in a display unit column. However, an implementation of the present disclosure is not limited thereto.

FIG. 6*c* is a fifth left view of a display panel of an embodiment of the present disclosure. In an exemplary implementation, as shown in FIG. 6*c*, in a display unit column, the distance L2 of the sound channel centers of two adjacent first display units 100 in the second direction Y is:

$$2\times W\times\tan\left(\frac{\alpha}{2}\right)$$

Herein, the sound channel center of the first display unit 100 is the geometric center of the first sub-display unit c103 in the first display unit 100, and W is a vertical distance between the sound receiving position A and a side surface of the display panel facing the sound receiving position A; α is an angle between linear distances M2 from the sound channel centers of two adjacent first display units 100 to the sound receiving position A respectively in a display unit column, . . . α is greater than 3.4 degrees, for example, α is greater than 3.4 degrees and less than 17 degrees.

Specifically, take the vertical distance W between the sound receiving position A and a side surface of the display panel facing the sound receiving position A is 2n as an example. In a display unit column, the distance L2 in the second direction Y of the sound channel centers of two adjacent first display units 100 is:

$$4n\times\tan\left(\frac{\alpha}{2}\right)$$

By controlling the distance L2 between the sound channel centers of two adjacent first display units 100 in a display unit column, the display panel of an embodiment of the present disclosure realizes the effect of sound and picture integration without increasing the cost.

Figure 7A:
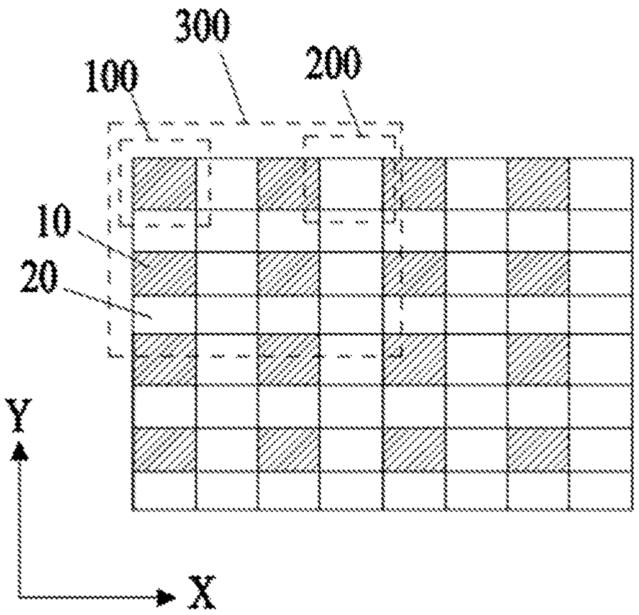
FIG. 7*a* is a first schematic structural diagram of a display panel after splicing of an embodiment of the present disclosure.

FIG. 7*a* is a first schematic structural diagram of a display panel after splicing of an embodiment of the present disclosure; In an exemplary implementation, as shown in FIG. 7*a*, the display panel of an embodiment of the present disclosure may first be spliced by at least one first display unit 100 and at least one second display unit 200 to form a standard unit 300, and then spliced by multiple of standard units 300 to form a display panel. Herein, a first display unit 100 includes a first sub-display unit 10, and a second display unit 200 includes a second sub-display unit 20. In a standard unit 300, a second display unit 200 may be provided on one side of the first display unit 100 in the first direction X; and a second display unit 200 may be provided on one side of the first display unit 100 in the second direction Y.

Figure 7B:
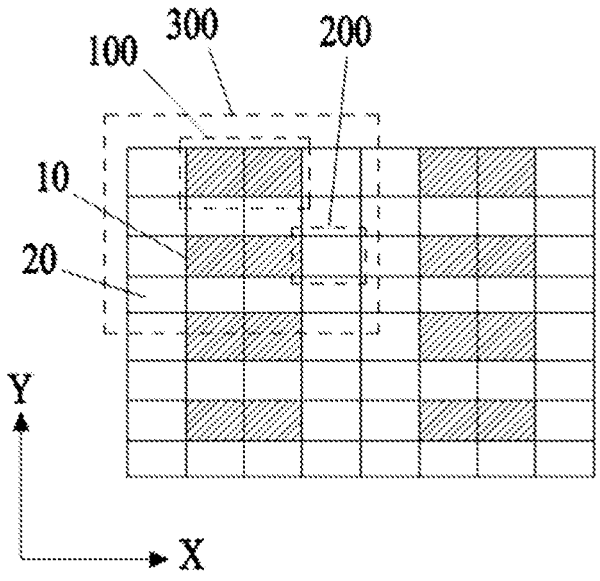
FIG. 7*b* is a second schematic structural diagram of a display panel after splicing of an embodiment of the present disclosure.

FIG. 7*b* is a second schematic structural diagram of a display panel after splicing of an embodiment of the present disclosure. In an exemplary implementation, as shown in FIG. 7*b*, the display panel of an embodiment of the present disclosure may first be spliced by at least one first display unit 100 and at least one second display unit 200 to form a standard unit 300, and then spliced by multiple standard units 300 to form a display panel. Herein, a first display unit 100 includes two first sub-display units 10 arranged along the first direction X, and a second display unit 200 includes a second sub-display unit 20. In the standard unit 300, a second display unit 200 may be provided on one side of the first display unit 100 in the first direction X; a second display unit row may be provided between the first display units 100 in the second direction Y, and the second display unit row includes two second display units 200 arranged along the first direction X.

In an exemplary implementation, the display panel of an embodiment of the present disclosure further includes a sound channel, the sound channel may be located on at least one side of the standard unit 300 to be compatible with the first display unit 100 and the second display unit 200.

In some implementations, the standard unit may all be spliced from multiple first display units, i.e. the standard unit may not include a second display unit to achieve high accuracy of audio-video positioning.

In an exemplary implementation, the standard unit may take a variety of shapes, for example, regular or irregular shapes, such as rectangular, circular, oval, polygonal or the like. However, an implementation of the present disclosure is not limited thereto.

In some implementations, the display panel of an embodiment of the present disclosure may all be directly spliced from multiple first sub-display units. Alternatively, the display panel of an embodiment of the present disclosure may be formed by directly splicing multiple first sub-display units and multiple second sub-display units. However, an implementation of the present disclosure is not limited thereto.

According to the research of the inventor of the present disclosure, the related display panel also includes a cabinet, the cabinet is located on the back of the standard unit, and the cabinet may accommodate a vibration device. In a traditional loudspeaker, the flexible folding ring may partially absorb the vibration of the diaphragm, prevent the vibration from transmitting to the frame, and cause abnormal sound and distortion of the frame vibration. However, in the screen sounding technology, the display panel makes bending vibration for the whole face thin plate, and there is no soft folding ring buffer around the circumference of it, so the vibration of the display panel is transmitted to the cabinet, which causes abnormal sound and distortion of the cabinet vibration and affects the clarity of sound.

In an exemplary implementation, the display panel of an embodiment of the present disclosure further includes a cabinet, the cabinet includes at least one first sub-cabinet, and the first sub-cabinet is provided with a first sub-display unit. The first sub-cabinet may be located on a side of the first sub-display unit away from the light emitting side thereof. The first sub-cabinet may support a first sub-display panel in the first sub-display unit and may accommodate components, such as a vibration device, a flexible circuit board and the like, in the first sub-display unit.

In an exemplary implementation, the cabinet further includes at least one second sub-cabinet, the second sub-display unit may be provided on the second sub-cabinet. The second sub-cabinet may be located on a side of the second sub-display unit away from the light emitting side thereof. The second sub-cabinet can support the second sub-display panel in the second sub-display unit and may accommodate components, such as the flexible circuit board and the like, in the second sub-display unit.

In an exemplary implementation, at least one first sub-display unit and at least one second sub-display unit may share a cabinet; alternatively, multiple first sub-display units may share a cabinet; alternatively, multiple second sub-display units may share a cabinet. However, an implementation of the present disclosure is not limited thereto.

Figure 8A:
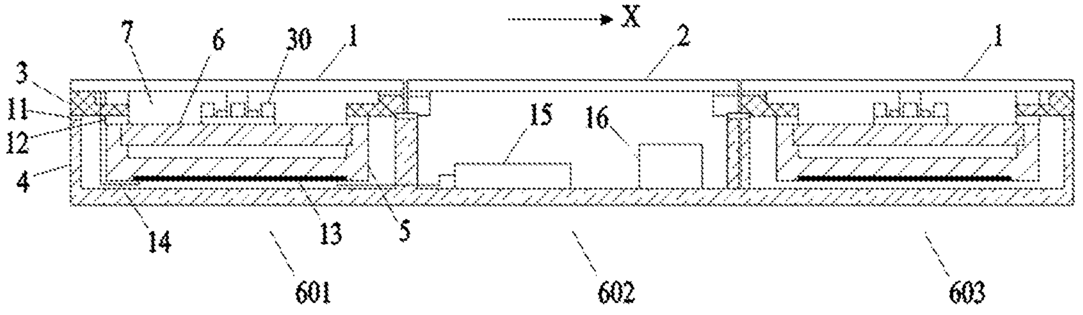
FIG. 8*a* is a first schematic structural diagram of a cabinet in a display panel of an embodiment of the present disclosure.

FIG. 8*a* is a first schematic structural diagram of a cabinet in a display panel of an embodiment of the present disclosure. In an exemplary implementation, as shown in FIG. 8*a*, the cabinet includes two first sub-cabinet 601 and a second sub-cabinet 602, two first sub-cabinet 601 and the second sub-cabinet 602 are arranged along the first direction X. The first sub-cabinet 601 may be provided with a first sub-display unit; and the second sub-cabinet 602 may be provided with a second sub-display unit.

In an exemplary implementation, as shown in FIG. 8*a*, the first sub-cabinet 601 is connected with a backlight surface of the first sub-display panel 1 in the first sub-display unit. The first sub-cabinet 601 has an inner cavity. The first sub-cabinet 601 includes a connecting frame 3, a splicing frame 4, a fixing bracket 5, and a mounting bracket 6.

In an exemplary implementation, as shown in FIG. 8*a*, the splicing frame 4 is located on a side of a backlight surface of the first sub-display panel 1, and the splicing frame 4 and the first sub-display panel 1 enclose an inner cavity of the first sub-cabinet 601. The connecting frame 3 includes a first portion, the first portion of the connecting frame 3 is located between the splicing frame 4 and the first sub-display panel 1, one side surface of the first portion is connected with the backlight surface of the first sub-display panel 1, the other side surface of the first portion is connected with the splicing frame 4, and the splicing frame 4 is connected with the first sub-display panel 1 through the first portion of the connecting frame 3. Wherein, the splicing frame 4 may be made of a metal material, for example, an aluminum material.

In an exemplary implementation, the connecting frame 3 may be magnetically connected with the splicing frame 4. Specifically, the connecting frame 3 is provided with a first magnetic suction piece, the splicing frame 4 is provided with a second magnetic suction piece, and the first magnetic suction piece is magnetically connected with the second magnetic suction piece, so that the connecting frame 3 is connected with the splicing frame 4. In some embodiments, the connecting frame 3 may be connected with the splicing frame 4 in other ways, for example, the connecting frame 3 may be connected with the splicing frame 4 by welding, screwing, or the like. However, an implementation of the present disclosure is not limited thereto.

In an exemplary implementation, as shown in FIG. 8*a*, a fixing bracket 5 is located in the inner cavity of the first sub-cabinet 601, and the fixing bracket 5 includes a side wall and a bottom wall, the side wall of the fixing bracket 5 is provided on a circumferential side of the bottom wall, exemplary, the side wall is provided around the circumference of the bottom wall. The connecting frame 3 also includes a second portion, and the second portion of the connecting frame 3 extends into the inner cavity of the first sub-cabinet 601. The second portion of the connecting frame 3 is connected with the side wall of the fixing bracket 5. The side wall of the fixing bracket 5 may be connected with the splicing frame 4 through the connecting frame 3. A side wall of the fixing bracket 5 can be in contact with a backlight surface of the first sub-display panel 1, and the side wall, the bottom wall of the fixing bracket 5 and the backlight surface of the first sub-display panel 1 enclose an acoustic cavity 7.

In an exemplary implementation, the acoustic cavity 7 may be a securely closed sealed cavity or an open cavity.

In an exemplary implementation, as shown in FIG. 8*a*, a mounting bracket 6 is provided in the acoustic cavity 7, and both ends of the mounting bracket 6 are respectively connected with the side wall of the fixing bracket 5. The vibration device 30 is provided on the mounting bracket 6 and is located on a side of the mounting bracket 6 close to the first sub-display panel 1. An end of the vibration device 30 away from the mounting bracket 6 may be in contact with the backlight surface of the first sub-display panel 1. The vibration device 30 can drive the corresponding first sub-display panel 1 to vibrate and sound.

In an exemplary implementation, as shown in FIG. 8*a*, the mounting bracket 6 may employ a beam structure to ensure air connectivity inside and outside the mounting bracket 6.

In the display panel of an embodiment of the present disclosure, a vibration device 30 is connected with a fixing bracket 5 through a mounting bracket 6, and the fixing bracket 5 is connected with a splicing frame 4 through a connecting frame 3, the connecting frame 3 can absorb the vibration of the vibration device 30, reduce the transmission of the vibration of the vibration device 30 to the splicing frame 4, and reduce the adverse effects, such as abnormal sound and distortion, caused by the vibration of the splicing frame 4.

In an exemplary implementation, a side surface of the fixing bracket 5 on a side away from the first sub-display panel 1 is not in contact with a bottom of the splicing frame 4, and the fixing bracket 5 is connected with the splicing frame 4 through the connecting frame 3 and is suspended in the inner cavity of the first sub-cabinet 601.

In an exemplary implementation, as shown in FIG. 8*a*, the first sub-cabinet 601 further includes a first damping element 11, the first damping element 11 is located between the first portion of the connecting frame 3 and the splicing frame 4, the first damping element 11 is capable of absorbing vibration of the connecting frame 3, and the vibration of the reducing vibration device 30 is transmitted to the splicing frame 4 through the connecting frame 3. Wherein, the first damping element 11 may be made of a flexible material, such as rubber or foam.

In an exemplary implementation, as shown in FIG. 8*a*, the first sub-cabinet 601 further includes a second damping element 12, the second damping element 12 is located between the second portion of the connecting frame 3 and the fixing bracket 5, the second damping element 12 is capable of absorbing the vibration of the fixing bracket 5, and the vibration of the reducing vibration device 30 is transmitted to the connecting frame 3 through the fixed bracket 5. Wherein, the second damping element 12 may be made of a flexible material, such as rubber or foam.

In an exemplary implementation, as shown in FIG. 8*a*, the thickness of the first damping element 11 is smaller than the thickness of the second damping element 12, thereby ensuring the flatness of the vibration device 30.

In an exemplary implementation, as shown in FIG. 8*a*, the display panel of an embodiment of the present disclosure further includes a circuit board 13 and a flexible circuit board 14, the circuit board 13 and the flexible circuit board 14 are located in the inner cavity of the first sub-cabinet 601 and on a side surface of the fixing bracket 5 on a side away from the first sub-display panel 1. One end of the flexible circuit board 14 is electrically connected with the circuit board 13, and the other end of the flexible circuit board 14 is electrically connected with the first sub-display panel 1. The circuit board 13 may be electrically connected with the first sub-display panel 1 through the flexible circuit board 14. Wherein, the circuit board 13 may include an audio signal processor and a display driving module.

In some embodiments, the circuit board may also be provided between a side surface of the fixing bracket away from the first sub-display panel and a bottom wall of the splicing frame. However, an implementation of the present disclosure is not limited thereto.

In an exemplary implementation, as shown in FIG. 8*a*, the second sub-cabinet 602 is connected with a backlight surface of the second sub-display panel 2 in the second sub-display unit 20. The second sub-cabinet 602 has an inner cavity. The display panel of an embodiment of the present disclosure further includes an adapter plate 15 and a power supply 16, the adapter plate 15 and the power supply 16 are provided in an inner cavity of the second sub-cabinet 602. The adapter plate 15 in the second sub-cabinet 602 may be electrically connected with the circuit board 13 in the first sub-cabinet 601.

Figure 8B:
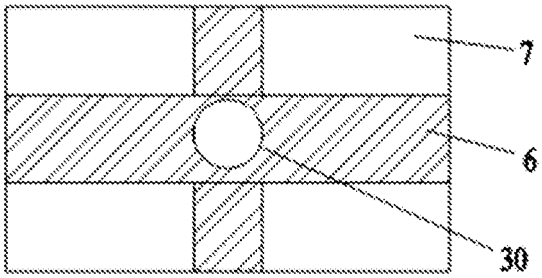
FIG. 8*b* is a first top view of a first cabinet in a display panel of an embodiment of the present disclosure.

FIG. 8*b* is a first top view of a first cabinet in a display panel of an embodiment of the present disclosure. In an exemplary implementation, as shown in FIG. 8*b*, the mounting bracket 6 is of a beam structure, the orthographic projection of the mounting bracket 6 on the plane where the display panel is located is cross-shaped, and the orthographic projection of the vibration device 30 on the plane where the display panel is located overlaps at the center of the orthographic projection of the mounting bracket 6 on the plane where the display panel is located.

Figure 9A:
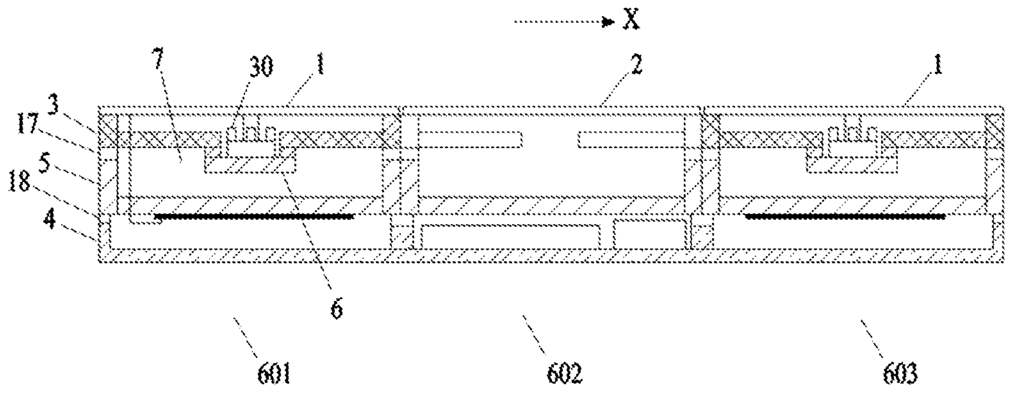
FIG. 9*a* is a second schematic structural diagram of a cabinet in a display panel of an embodiment of the present disclosure.

FIG. 9*a* is a second schematic structural diagram of a cabinet in a display panel of an embodiment of the present disclosure. In an exemplary implementation, as shown in FIG. 9*a*, the first sub-cabinet 601 is connected with a backlight surface of the first sub-display panel 1 in the first sub-display unit. The first sub-cabinet 601 has an inner cavity. The first sub-cabinet 601 includes a connecting frame 3, a splicing frame 4, a fixing bracket 5, and a mounting bracket 6.

In an exemplary implementation, as shown in FIG. 9*a*, the fixing bracket 5 is located on a side of a backlight surface of the first sub-display panel 1, the fixing bracket 5 includes a side wall and a bottom wall, the side wall of the fixing bracket 5 is provided on a circumference side of the bottom wall, and exemplary, the side wall is provided around the circumference of the bottom wall. An acoustic cavity 7 is enclosed by the side wall and the bottom wall of the fixing bracket 5 and the backlight surface of the first sub-display panel 1.

In an exemplary implementation, as shown in FIG. 9*a*, the connecting frame 3 includes a first portion, the first portion of the connecting frame 3 is located between the fixing bracket 5 and the first sub-display panel 1, a side surface of the first portion of the connecting frame 3 is connected with the backlight surface of the first sub-display panel 1, and the other side surface of the first portion is connected with the fixing bracket 5, the side wall of the fixing bracket 5 may be connected with the backlight surface of the first sub-display panel 1 through the first portion of the connecting frame 3. Wherein, the splicing frame 4 may be made of a metal material, for example, an aluminum material.

In an exemplary implementation, as shown in FIG. 9*a*, the splice frame 4 is located on a side of the fixing bracket 5 away from the first sub-display panel 1, and a side wall of the splicing frame 4 may be in contact with the fixing bracket 5 for supporting the fixing bracket 5.

In an exemplary implementation, the splicing frame 4 may be magnetically connected with the fixing bracket 5. Specifically, a third magnetic suction piece is provided on the splicing frame 4, and a fourth magnetic suction piece is provided on the fixing bracket 5, the third magnetic suction piece is magnetically connected with the fourth magnetic suction piece, so that the splicing frame 4 is connected with the fixing bracket 5. In some embodiments, the splicing frame 4 may be connected with the fixing bracket 5 in other ways, for example, the splicing frame 4 may be connected with the fixing bracket 5 by welding, screwing, or the like. However, an implementation of the present disclosure is not limited thereto.

In an exemplary implementation, as shown in FIG. 9*a*, the mounting bracket 6 is provided in the acoustic cavity 7. The connecting frame 3 further includes a second portion, the second portion of the connecting frame 3 extends into the acoustic cavity 7. The second portion of the connecting frame 3 is connected with the mounting bracket 6. The vibration device 30 is provided on the mounting bracket 6 and is located on a side of the mounting bracket 6 close to the first sub-display panel 1. An end of the vibration device 30 away from the mounting bracket 6 may be in contact with the backlight surface of the first sub-display panel 1. The vibration device 30 can drive the corresponding first sub-display panel 1 to vibrate and sound. Wherein, the section of the mounting bracket 6 perpendicular to the plane where the display panel is located is U-shaped. However, an implementation of the present disclosure is not limited thereto.

In the display panel of an embodiment of the present disclosure, the vibration device 30 is connected with the connecting frame 3 through the mounting bracket 6, and the connecting frame 3 is connected with the splicing frame 4, the connecting frame 3 can absorb the vibration of the vibration device 30, reduce the transmission of the vibration of the vibration device 30 to the splicing frame 4, and reduce the adverse effects, such as abnormal sound and distortion, caused by the vibration of the splicing frame 4.

In an exemplary implementation, as shown in FIG. 9*a*, the first sub-cabinet 601 further includes a third damping element 17, the third damping element 17 is located between the first portion of the connecting frame 3 and the fixing bracket 5, the third damping element 17 can absorb the vibration of the connecting frame 3 and reduce the transmission of the vibration of the vibration device 30 to the fixing bracket 5 and the splicing frame 4 through the connecting frame 3. Wherein, the third damping element 17 may be made of a flexible material, such as rubber or foam.

In an exemplary implementation, as shown in FIG. 9*a*, the first sub-cabinet 601 further includes a fourth vibration damping element 18, the fourth vibration damping element 18 is located between the fixing bracket 5 and the splicing frame 4, the fourth vibration damping element 18 can absorb the vibration of the fixing bracket 5 and reduce the transmission of the vibration of the vibration device 30 to the splicing frame 4 through the fixing bracket 5. Wherein, the fourth damping element 18 may be made of a flexible material, such as rubber or foam.

In an exemplary implementation, as shown in FIG. 9*a*, the thickness of the third damping element 17 is smaller than the thickness of the fourth damping element 18, thereby ensuring the flatness of the vibration device 30.

Figure 9B:
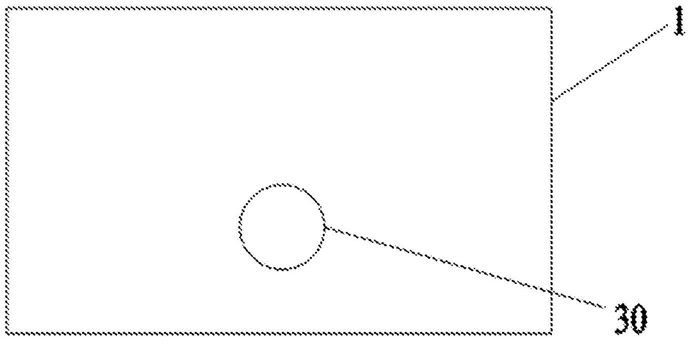
FIG. 9*b* is a second top view of a first cabinet in a display panel of an embodiment of the present disclosure.

FIG. 9*b* is a second top view of a first cabinet in a display panel of an embodiment of the present disclosure. In an exemplary implementation, as shown in FIG. 9*b*, the orthographic projection of the vibration device 30 in the plane where the display panel is located is not overlapped with the center of the orthographic projection of the first sub-display panel 1 in the plane where the display panel is located.

In an exemplary implementation, the second portion of the connecting frame 3 may be of a panel structure, the second portion of the connecting frame 3 extends into the acoustic cavity 7, and the acoustic cavity 7 may be divided to form a first cavity and a second cavity, and the first cavity is located on a side of the second cavity close to the first sub-display panel 1.

Figure 10A:
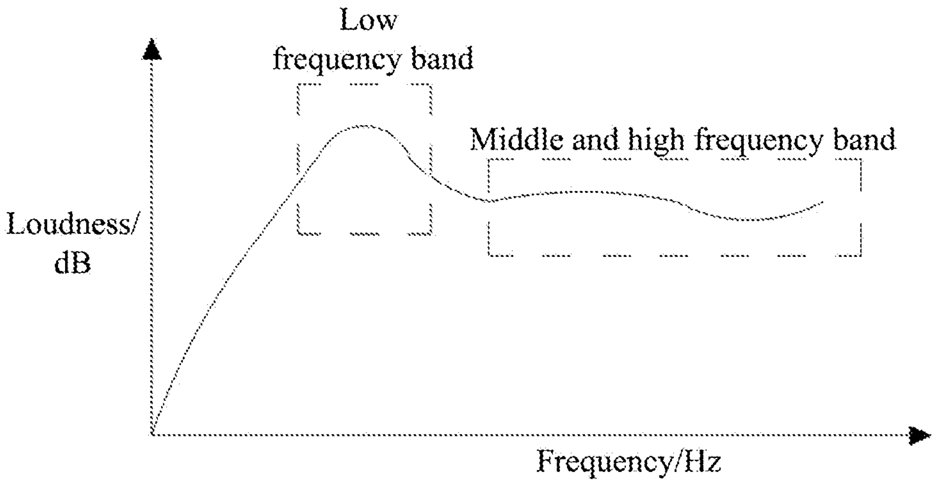
FIG. 10*a* is a graph of an audio frequency of a first sub-display panel in a display panel of an embodiment of the present disclosure.

FIG. 10*a* is a graph of an audio frequency of a first sub-display panel in a display panel of an embodiment of the present disclosure. In FIG. 10*a*, the x-axis is the frequency value of the audio driving signal input to the first sub-display panel, and the y-axis is the loudness of the sound emitted by the first sub-display panel. According to the research of the inventor of the present disclosure, the connecting frame serves as an isolation plate of the acoustic cavity. When the small-sized first sub-display panel (e.g. below 15 o'clock) vibrates to sound, in the low frequency band, the first sub-display panel vibrates to radiate sound in an approximate "piston" mode; in the middle and high frequency band, the first sub-display panel vibrates to radiate sound in an approximate "divided" mode. Loudness generated by the vibration of the first sub-display panel at the measurement point is the superposition of the vibration radiation loudness of each point on the first sub-display panel, but because the low frequency vibration mode of the first sub-display panel is different from the medium and high frequency vibration mode, the vibration phase of each point of the first sub-display panel is the same at low frequency (approximate piston vibration mode), and the radiation loudness of each point is completely the same. In the middle and high frequency, the phase of each point of the first sub-display panel is opposite or randomly distributed (approximately divided vibration mode), and the radiation loudness of each point is completely different, which leads to the different radiation efficiency of the first sub-display panel at low frequency and at middle and high frequency. The low frequency radiation loudness is high, the medium and high frequency radiation loudness is low, and the frequency response curve is uneven, as shown in FIG. 10*a*. When the small-sized first sub-display panel emits sound, the sound pressure in each frequency band is unbalanced, which leads to poor clarity, concealment of medium and high frequency details and other problems and affects subjective hearing sense.

Figure 10B:
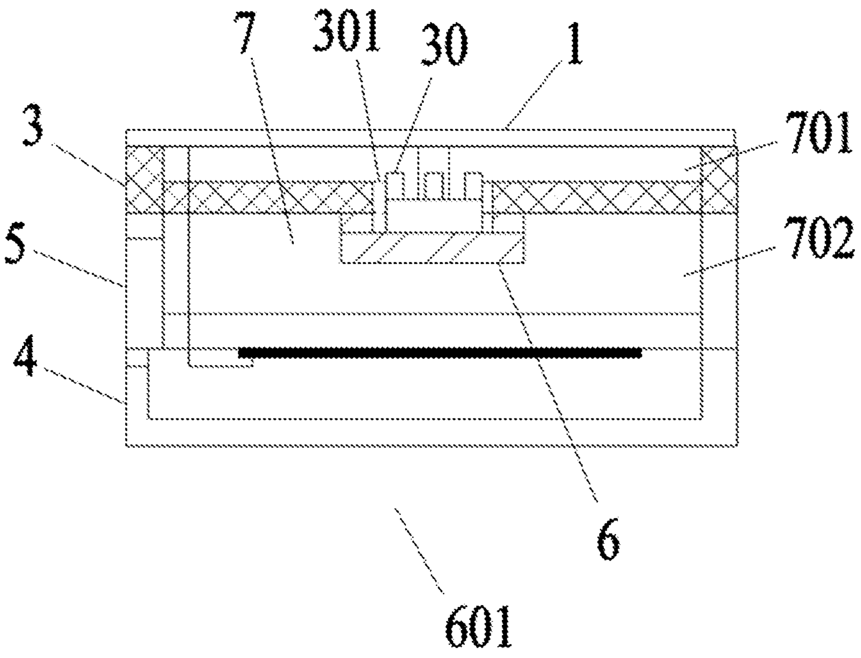
FIG. 10*b* is a first schematic structural diagram of a first cabinet in a display panel of an embodiment of the present disclosure.

FIG. 10*b* is a first schematic structural diagram of a first cabinet in a display panel of an embodiment of the present disclosure. In an exemplary implementation, as shown in FIG. 10*b*, the connecting frame 3 includes a second portion provided in the acoustic cavity 7, the second portion of the connecting frame 3 may be of a plate structure, the second portion of the connecting frame 3 separates the acoustic cavity 7 to form a first cavity 701 and a second cavity 702, and the first cavity 701 is located on a side of the second cavity 702 close to the first sub-display panel 1. Exemplary, the volume of the first cavity 701 is smaller than the volume of the second cavity 702. The second portion of the connecting frame 3 is provided with an acoustic vent 301. The acoustic vent 301 penetrates a second portion of the connecting frame 3 and communicates the first cavity 701 with the second cavity 702. When the display panel vibrates at low frequency, the acoustic vent 301 can communicate the first cavity 701 with the second cavity 702, the pressure of the first cavity 701 in the low frequency vibration is reduced, so that the loudness of the first sub-display panel in the low frequency band is more uniform, the low frequency piston vibration mode is modulated into the divided vibration mode, the pressure of the low frequency vibration is reduced, the loudness of each frequency band of the first sub-display panel is balanced, and the sound quality of the first sub-display panel is improved.

Figure 11A:
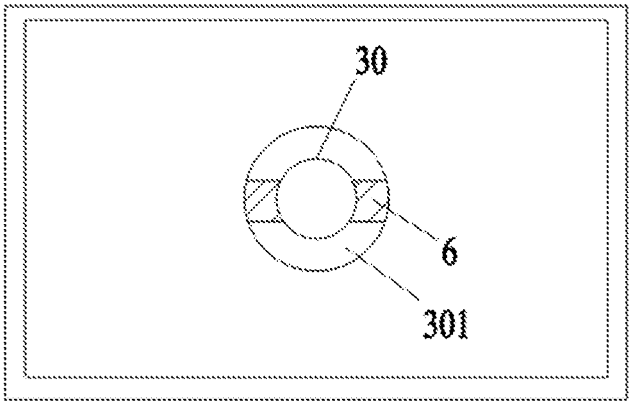
FIG. 11*a* is a first schematic structural diagram of an acoustic vent in a display panel of an embodiment of the present disclosure.

FIG. 11*a* is a first schematic structural diagram of an acoustic vent in a display panel of an embodiment of the present disclosure. In the exemplary implementation, as shown in FIG. 11*a*, an orthographic projection of the acoustic vent 301 on the plane where the display panel is located is annular, and the acoustic vent 301 is provided around the circumference of the vibration device 30. A side wall of the acoustic vent 301 close to the side of the vibration device 30 is in contact with the vibration device 30. Exemplary, the acoustic vent 301 may be provided concentric with the vibration device 30.

In an exemplary implementation, the ring width of the acoustic vent 301 may be 1 mm to 10 mm. If the ring width of the acoustic vent 301 is too small, the slit will make sound, which will easily lead to sound distortion. If the ring width of the acoustic vent 301 is too large, when the display panel vibrates at a low frequency, the sound pressure distribution in the first cavity 701 is not different from the sound pressure distribution in the second cavity 702, and the sound pressure of the low frequency vibration cannot be reduced.

As shown in FIG. 11*a*, the mounting bracket 6 may adopt a beam structure. The mounting bracket 6 may be connected with the vibration device 30 by an anti-loosening screw. The connecting frame 3 may be connected with the fixing bracket 5 by an anti-loosening screw.

Figure 11B:
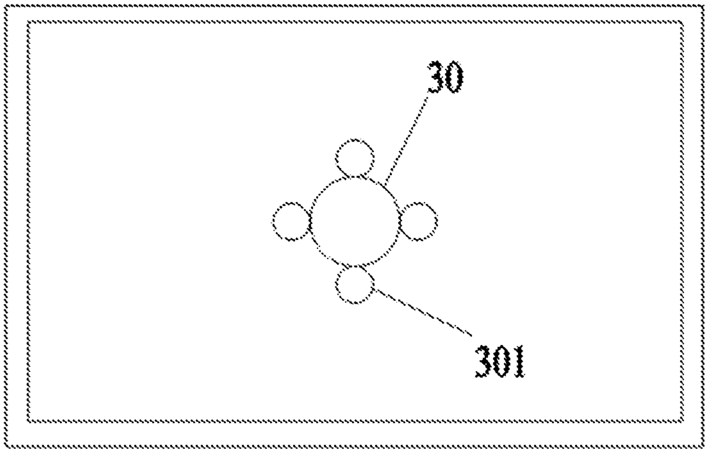
FIG. 11*b* is a second schematic structural diagram of an acoustic vent in a display panel of an embodiment of the present disclosure.

FIG. 11*b* is a second schematic structural diagram of an acoustic vent in a display panel of an embodiment of the present disclosure. In an exemplary implementation, as shown in FIG. 11*b*, at least one acoustic vent 301 is provided in the connecting frame 3. The orthographic projection of the acoustic vent 301 on the plane where the display panel is located is circular. The acoustic vent 301 is located on a circumference side of the vibration device 30. The diameter of the acoustic vent 301 may be 2 mm to 20 mm. For example, an acoustic vent may be provided in the connecting frame 3, and an acoustic vent may be located on a circumference side of the vibration device 30.

In some embodiments, the orthographic projection of the acoustic vent on the plane where the display panel is located may also be of other shapes. For example, the orthographic projection of the acoustic vent on the plane where the display panel is located can be a regular or irregular shape, such as rectangle, diamond, oval, polygon, or the like.

In an exemplary implementation, as shown in FIG. 11*b*, multiple acoustic vents 301 may be provided in the connecting frame 3, and the multiple acoustic vents 301 may be provided around the circumference of the vibration device 30. The multiple acoustic vents 301 may be symmetrically provided around the circumference of the vibration device 30 or asymmetrically provided around the circumference of the vibration device 30. For example, the connecting frame 3 may be provided with four acoustic vents 301 provided around the circumference of the vibration device 30, two acoustic vents 301 are symmetrically provided on two sides of the first direction X of the vibration device 30, and two acoustic vents 301 are symmetrically provided on two sides of the second direction Y of the vibration device 30, as shown in FIG. 11*b*. Alternatively, two acoustic vents may be provided in the connecting frame, and two acoustic vents are symmetrically provided on two sides of the vibration device 30. Alternatively, two acoustic vents may be provided in the connecting frame, and two acoustic vents are asymmetrically provided on the circumference side of the vibration device 30.

Figure 12A:
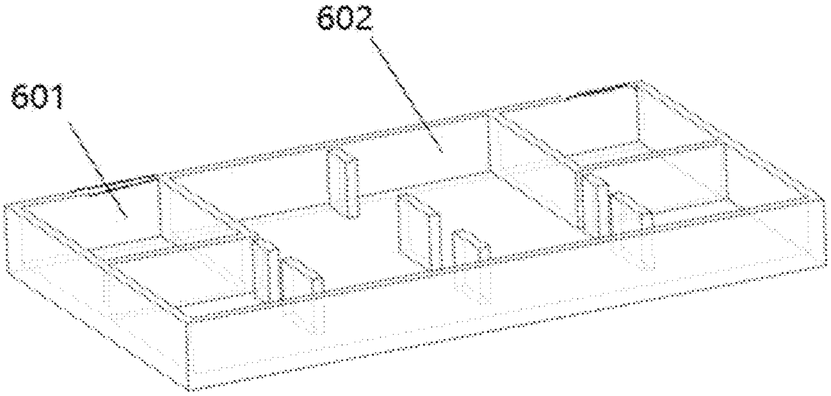
FIG. 12*a* is a three-dimensional view of a cabinet in a display panel of an embodiment of the present disclosure.
Figure 12B:
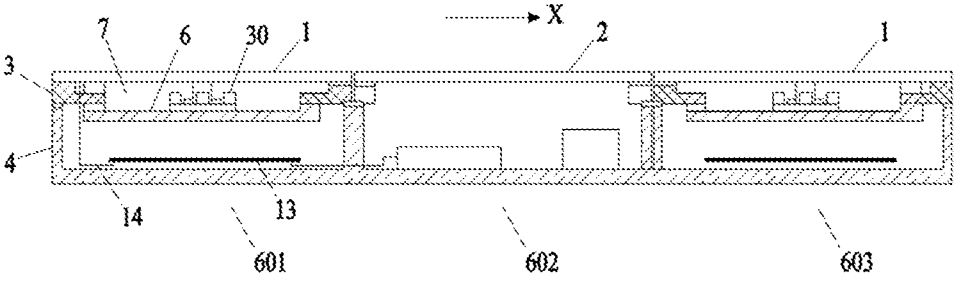
FIG. 12*b* is a third schematic structural diagram of a cabinet in a display panel of an embodiment of the present disclosure.

FIG. 12*a* is a three-dimensional view of a cabinet in a display panel of an embodiment of the present disclosure; and FIG. 12*b* is a third schematic structural diagram of a cabinet in a display panel of an embodiment of the present disclosure. In an exemplary implementation, as shown in FIG. 12*a* and FIG. 12*b*, the cabinet in the display panel of an embodiment of the present disclosure includes a first sub-cabinet 601 and a second sub-cabinet 602. The first sub-cabinet 601 may be provided with a first sub-display unit; and the second sub-cabinet 602 may be provided with a second sub-display unit.

In an exemplary implementation, as shown in FIG. 12*b*, the first sub-cabinet 601 is connected with a backlight surface of the first sub-display panel 1 in the first sub-display unit. The first sub-cabinet 601 has an inner cavity. The first sub-cabinet 601 includes a connecting frame 3, a splicing frame 4, and a mounting bracket 6.

In the exemplary implementation, as shown in FIG. 12*b*, the splicing frame 4 is located on a side of a backlight surface of the first sub-display panel 1, and the splicing frame 4 and the first sub-display panel 1 enclose the inner cavity of the first sub-cabinet 601, and the inner cavity of the first sub-cabinet 601 may serve as an acoustic cavity 7. The connecting frame 3 includes a first portion, the first portion of the connecting frame 3 is located between the splicing frame 4 and the first sub-display panel 1, a side surface of the first portion is connected with a backlight surface of the first sub-display panel 1, the other side surface of the first portion is connected with the splicing frame 4, and the splicing frame 4 is connected with the first sub-display panel 1 through the first portion of the connecting frame 3. Wherein, the splicing frame 4 may be made of a metal material, for example, an aluminum material.

In an exemplary implementation, as shown in FIG. 12*b*, the connecting frame 3 includes a second portion, and the second portion of the connecting frame 3 extends into the acoustic cavity 7. The mounting bracket 6 is provided in the acoustic cavity 7, and both ends of the mounting bracket 6 are respectively connected with the second portion of the connecting frame 3. The mounting bracket 6 is connected with the splicing frame 4 through the connecting frame 3. The vibration device 30 is provided on the mounting bracket 6 and is located on a side of the mounting bracket 6 close to the first sub-display panel 1. An end of the vibration device 30 away from the mounting bracket 6 may be in contact with a backlight surface of the first sub-display panel 1. The vibration device 30 can drive the corresponding first sub-display panel 1 to vibrate and sound.

The vibration device 30 in the display panel of an embodiment of the present disclosure is connected with the connecting frame 3 through the mounting bracket 6, and the connecting frame 3 can absorb the vibration of the vibration device 30, reduce the transmission of the vibration of the vibration device 30 to the splicing frame 4, and reduce the adverse effects, such as abnormal sound and distortion, caused by the vibration of the splicing frame 4.

In the display panel of an embodiment of the present disclosure, the inner cavity of the first sub-cabinet 601 is used as the acoustic cavity 7, thereby eliminating the fixing bracket, saving materials and reducing costs.

The present disclosure further provides a display apparatus, including the display panel of the aforementioned exemplary embodiment. The display apparatus may be any product or component with a display function, such as a mobile phone, a tablet computer, a television, a display, a laptop computer, a digital photo frame, or a navigator.

Although the implementations disclosed in the present disclosure are described as above, the described contents are only implementations which are used for facilitating the understanding of the present disclosure, but are not intended to limit the present invention. Any skilled person in the art to which the present disclosure pertains may make any modifications and variations in forms and details of implementation without departing from the spirit and scope of the present disclosure. However, the patent protection scope of the present invention should be subject to the scope defined by the appended claims.

The invention claimed is:

1. A display panel, comprising at least two first display units, wherein the first display unit comprises at least one first sub-display unit, the first sub-display unit comprises a first sub-display panel and a vibration device connected with the first sub-display panel, the at least two first display units are arranged along a first direction to form display unit rows, in one of the display unit rows, the distance L1 of sound channel centers of two adjacent first display units in the first direction is:

$$2 \times W \times \tan\left(\frac{\beta}{2}\right)$$

wherein W is the vertical distance between a sound receiving position and a side surface of the display panel facing the sound receiving position; β is an angle between linear distances from sound channel centers of two adjacent first display units to the sound receiving position respectively in a display unit row, and the β is greater than 2.4 degrees.

2. The display panel according to claim 1, wherein, the β is greater than 2.4 degrees and less than 17 degrees.

3. The display panel according to claim 1, wherein, the at least two first display units are arranged along a second direction to form display unit columns, in one of the display unit columns, the distance L2 of the sound channel centers of two adjacent first display units in the second direction is:

$$2 \times W \times \tan\left(\frac{\alpha}{2}\right)$$

wherein, the first direction is different from the second direction; W is a vertical distance between the sound receiving position and a side surface of the display panel facing the sound receiving position; a is an angle between linear distances from the sound channel centers of two adjacent first display units to the sound receiving position respectively in a display unit column, and the α is greater than 3.4 degrees.

4. The display panel according to claim 3, wherein, the α is greater than 3.4 degrees and less than 17 degrees.

5. The display panel according to claim 1, wherein, further comprising at least one second display unit, the second display unit comprises at least one second sub-display unit, the second sub-display unit comprises a second sub-display panel, and at least one of the second sub-display units is located between two adjacent first display units in one of the display unit rows.

6. The display panel according to claim 1, wherein, the first display unit comprises the first sub-display unit, and the sound channel center of the first display unit is a geometric center of the first display unit.

7. The display panel according to claim 1, wherein, the first display unit comprises a plurality of first sub-display units, and the plurality of first sub-display units are configured to be input an identical audio driving signal.

8. The display panel according to claim 1, wherein, the first display unit comprises a plurality of first sub-display units, and the plurality of first sub-display units are configured to be input different audio driving signals.

9. The display panel according to claim 8, wherein, the first display unit comprises a first sub-display unit a and a first sub-display unit b, the first sub-display unit a is configured to be input a full frequency audio driving signal, the full frequency audio driving signal comprises a low frequency audio driving signal, an intermediate frequency audio driving signal, and a high frequency audio driving signal, and the first sub-display unit b is configured to be input the low frequency audio driving signal.

10. The display panel according to claim 9, wherein, the sound channel center of the first display unit is a geometric center of the first sub-display unit a.

11. The display panel according to claim 8, wherein, the first display unit comprises a first sub-display unit a, a first sub-display unit b, and a first sub-display unit c, the first sub-display unit a is configured to be input a full frequency audio driving signal, the full frequency audio driving signal comprises a low frequency audio driving signal, an intermediate frequency audio driving signal, and a high frequency audio driving signal, the first sub-display unit b is configured to be input the low frequency audio driving signal, and the first sub-display unit c is configured to be input the high frequency audio driving signal.

12. The display panel according to claim 11, wherein, the sound channel center of the first display unit is a geometric center of the first sub-display unit c.

13. The display panel according to claim 1, wherein, further comprising a partition structure, the partition structure is located on at least one side of the first sub-display panel, wherein the partition structure is a slit or a flexible material.

14. The display panel according to claim 1, wherein, the at least two first display units are connected with a driving signal line.

15. The display panel according to claim 1, wherein, further comprising a cabinet, the cabinet comprises at least one first sub-cabinet, and the first sub-display unit is provided on the first sub-cabinet.

16. The display panel according to claim 15, wherein, the first sub-cabinet comprises a connecting frame, a splicing frame, a fixing bracket, and a mounting bracket, the splicing frame is located on a side of a backlight surface of the first sub-display panel, the splicing frame and the first sub-display panel enclose an inner cavity, at least a portion of the connecting frame is located between the splicing frame and the first sub-display panel, at least a portion of the connecting frame extends into the inner cavity, the fixing bracket is located in the inner cavity and connected with at least a portion of the connecting frame, the fixing bracket and the first sub-display panel enclose an acoustic cavity, the mounting bracket is provided in the acoustic cavity, and the vibration device is provided on the mounting bracket.

17. The display panel according to claim 15, wherein, the first sub-cabinet comprises a connecting frame, a splicing frame, a fixing bracket, and a mounting bracket, the fixing bracket is located on a side of a backlight surface of the first sub-display panel, the fixing bracket and the first sub-display panel enclose an acoustic cavity, at least a portion of the connecting frame is located between the fixing bracket and the first sub-display panel, the splicing frame is located at a side of the fixing bracket away from the first sub-display panel, the mounting bracket is provided in the acoustic cavity, at least a portion of the connecting frame extends into the acoustic cavity and is connected with the mounting bracket, and the vibration device is provided on the mounting bracket.

18. The display panel according to claim 17, wherein, at least a portion of the connecting frame extends into the acoustic cavity, the acoustic cavity is divided to form a first cavity and a second cavity, wherein the first cavity is located at a side of the second cavity close to the first sub-display panel, an acoustic vent is provided in the connecting frame, and the acoustic vent communicates the first cavity with the second cavity.

19. The display panel according to claim 15, wherein, the first sub-cabinet comprises a connecting frame, a splicing frame, and a mounting bracket, the splicing frame is located on a side of a backlight surface of the first sub-display panel, the splicing frame and the first sub-display panel enclose an inner cavity, the inner cavity serves as an acoustic cavity, at least a portion of the connecting frame is provided between the splicing frame and the first sub-display panel, at least a portion of the connecting frame extends into the acoustic cavity, the mounting bracket is provided in the acoustic cavity, the mounting bracket is connected with at least a portion of the connecting frame, and the vibration device is provided on the mounting bracket.

20. A display apparatus, comprising the display panel according to claim 1.

* * * * *